United States Patent
Taylor, III et al.

(10) Patent No.: US 11,263,600 B2
(45) Date of Patent: Mar. 1, 2022

(54) AUTOMATED TRUSTEE PAYMENTS SYSTEM

(71) Applicant: 4 S Technologies, LLC, Mountainside, NJ (US)

(72) Inventors: W. C. Taylor, III, North Dover, NJ (US); Michael S. Ackerman, Morris Plains, NJ (US)

(73) Assignee: 4 S TECHNOLOGIES, LLC, Jacksonville, FL (US)

(*) Notice: Subject to any disclaimer, the term of this patent is extended or adjusted under 35 U.S.C. 154(b) by 1497 days.

(21) Appl. No.: 15/080,212

(22) Filed: Mar. 24, 2016

(65) Prior Publication Data

US 2016/0283919 A1   Sep. 29, 2016

Related U.S. Application Data

(60) Provisional application No. 62/137,569, filed on Mar. 24, 2015.

(51) Int. Cl.
| | | |
|---|---|---|
| *G06Q 20/10* | (2012.01) | |
| *G06Q 20/04* | (2012.01) | |
| *G06Q 40/02* | (2012.01) | |
| *G06Q 20/40* | (2012.01) | |

(52) U.S. Cl.
CPC ....... *G06Q 20/042* (2013.01); *G06Q 20/4037* (2013.01); *G06Q 40/025* (2013.01)

(58) Field of Classification Search
CPC ...... G06Q 40/00; G06Q 40/02; G06Q 40/025; G06Q 20/10; G06Q 20/102; G06Q 20/042; G06Q 20/4037; G06Q 20/40; G06Q 30/04

USPC ......................................... 705/35, 38, 39, 40
See application file for complete search history.

(56) References Cited

U.S. PATENT DOCUMENTS

| | | | |
|---|---|---|---|
| 5,557,780 A | 9/1996 | Edwards | |
| 5,675,785 A | 10/1997 | Hall et al. | |
| 6,633,875 B2 | 10/2003 | Brady | |
| 7,546,312 B1 | 6/2009 | Xu et al. | |
| 7,702,575 B1 | 4/2010 | Lofton et al. | |
| 7,856,385 B2* | 12/2010 | Petr ..................... | G06Q 20/102 |
| | | | 705/35 |
| 7,945,583 B2 | 5/2011 | Moyaux | |
| 8,484,511 B2 | 7/2013 | Tidwell | |
| 8,606,666 B1 | 12/2013 | Courbage et al. | |
| 8,751,382 B2* | 6/2014 | Shapiro ................ | G06Q 20/102 |
| | | | 705/38 |

(Continued)

OTHER PUBLICATIONS

Ladwig, K. (2005). Bankruptcy sales and servicing. Collections & Credit Risk, 10(5), 33-36. Retrieved from https://dialog.proquest.com/professional/docview/198124669?accountid=131444. (Year: 2005).*

(Continued)

*Primary Examiner* — Hani M Kazimi

(57) ABSTRACT

The present automated trustee payments system implements a series of automated processes which significantly reduce, and in many cases, eliminate a creditor user's work that is required to accurately and timely process incoming Chapter 13 Trustee remittances. The automated trustee payments system also effects application of the funds to the proper bankrupt debtor accounts and accounts for the funds against the proper creditor's loan account segments (e.g., the bankruptcy estate pre-petition indebtedness or the post-petition ongoing payments).

16 Claims, 48 Drawing Sheets

(56) References Cited

U.S. PATENT DOCUMENTS

| | | | |
|---|---|---|---|
| 8,756,132 B2 | 6/2014 | Petr et al. | |
| 8,768,797 B2* | 7/2014 | Schock | G06Q 40/10 |
| | | | 705/30 |
| 8,874,476 B1 | 10/2014 | Taylor et al. | |
| 9,361,656 B2 | 6/2016 | Taylor, III | |
| 2001/0029482 A1 | 10/2001 | Tealdi | |
| 2001/0049678 A1 | 12/2001 | Yaginuma | |
| 2003/0061132 A1 | 3/2003 | Yu, Sr. | |
| 2004/0215656 A1 | 10/2004 | Dill | |
| 2004/0236805 A1 | 11/2004 | Gordon | |
| 2005/0102226 A1 | 5/2005 | Oppenheimer et al. | |
| 2006/0059073 A1 | 3/2006 | Walzak | |
| 2006/0085330 A1* | 4/2006 | Imrey | G06Q 20/10 |
| | | | 705/39 |
| 2006/0271450 A1 | 11/2006 | Cohen et al. | |
| 2006/0282359 A1 | 12/2006 | Nobili et al. | |
| 2007/0011183 A1 | 1/2007 | Langseth | |
| 2007/0156580 A1* | 7/2007 | Imrey | G06Q 20/04 |
| | | | 705/39 |
| 2007/0185797 A1 | 8/2007 | Robinson | |
| 2008/0059364 A1 | 3/2008 | Tidwell et al. | |
| 2009/0043743 A1 | 2/2009 | Kraft | |
| 2009/0070245 A1* | 3/2009 | Petr | G06Q 20/102 |
| | | | 705/35 |
| 2010/0191660 A1 | 7/2010 | Burr et al. | |
| 2010/0211484 A1 | 8/2010 | Malcolm et al. | |
| 2010/0241558 A1 | 9/2010 | Chmielewski et al. | |
| 2010/0268640 A1* | 10/2010 | Kuyper | G06Q 40/02 |
| | | | 705/38 |
| 2010/0332453 A1 | 12/2010 | Prahlad | |
| 2011/0016042 A1 | 1/2011 | Cho et al. | |
| 2011/0106694 A1 | 5/2011 | Petr et al. | |
| 2011/0119169 A1* | 5/2011 | Passero | G06Q 40/00 |
| | | | 705/35 |
| 2011/0191227 A1 | 8/2011 | Barrett | |
| 2011/0238566 A1 | 9/2011 | Santos | |
| 2011/0251945 A1 | 10/2011 | Liao et al. | |
| 2011/0295739 A1* | 12/2011 | Rice | G06Q 40/02 |
| | | | 705/39 |
| 2011/0320399 A1 | 12/2011 | Ledwich et al. | |
| 2012/0246124 A1 | 9/2012 | Arasaratnam | |
| 2013/0138564 A1* | 5/2013 | Shapiro | G06Q 20/10 |
| | | | 705/44 |
| 2013/0198093 A1 | 8/2013 | Taylor, III | |
| 2014/0081833 A1* | 3/2014 | Koop | G06Q 40/02 |
| | | | 705/38 |
| 2016/0163006 A9 | 6/2016 | Taylor, III | |

OTHER PUBLICATIONS

"What is PACER?" Aug. 4, 2008, http://www.pacer.gov/pacerdesc.html (3 pages total).

"About the NOC" Sep. 17, 2010, Copyright 2009 https://13datacenter.com/about/index.asp (1 page total).

Adomavicius, Gediminas, et al., "Using Data Mining Methods to Build Customer Profiles", Computer, vol. 34, Issue 2, IEEE Computer Society, © 2001, pp. 74-82. (9 pages total).

Shaker, R., et al., "A Rule Driven Bi-Directional Translation System for Remapping Queries and Result Sets Between a Mediated Schema and Heterogeneous Data Sources", AMIA 2002 Annual Symposium Proceedings, San Antonio, TX, Nov. 9-13, 2002, pp. 692-696. (5 pages total).

Rahm, Erhard, et al., "A survey of approaches to automatic schema matching", The VLDB Journal, vol. 10, Issue 4, Dec. 2001, pp. 334-350. (17 pages total).

Stranieri, Andrew, et al., "Chap 4: Knowledge Discovery from Legal Databases—Using Neural Networks and Data Mining to Build Legal Decision Support Systems", Information and Technology Lawyers, Springer, © 2006, pp. 81-117. (37 pages total).

Stanford, Monte, "Mortgage Banking: Internet and Integration are Key", IT Professional, vol. 4, Issue 2, Mar./Apr. 2002, pp. 47-52.(6 pages total).

* cited by examiner

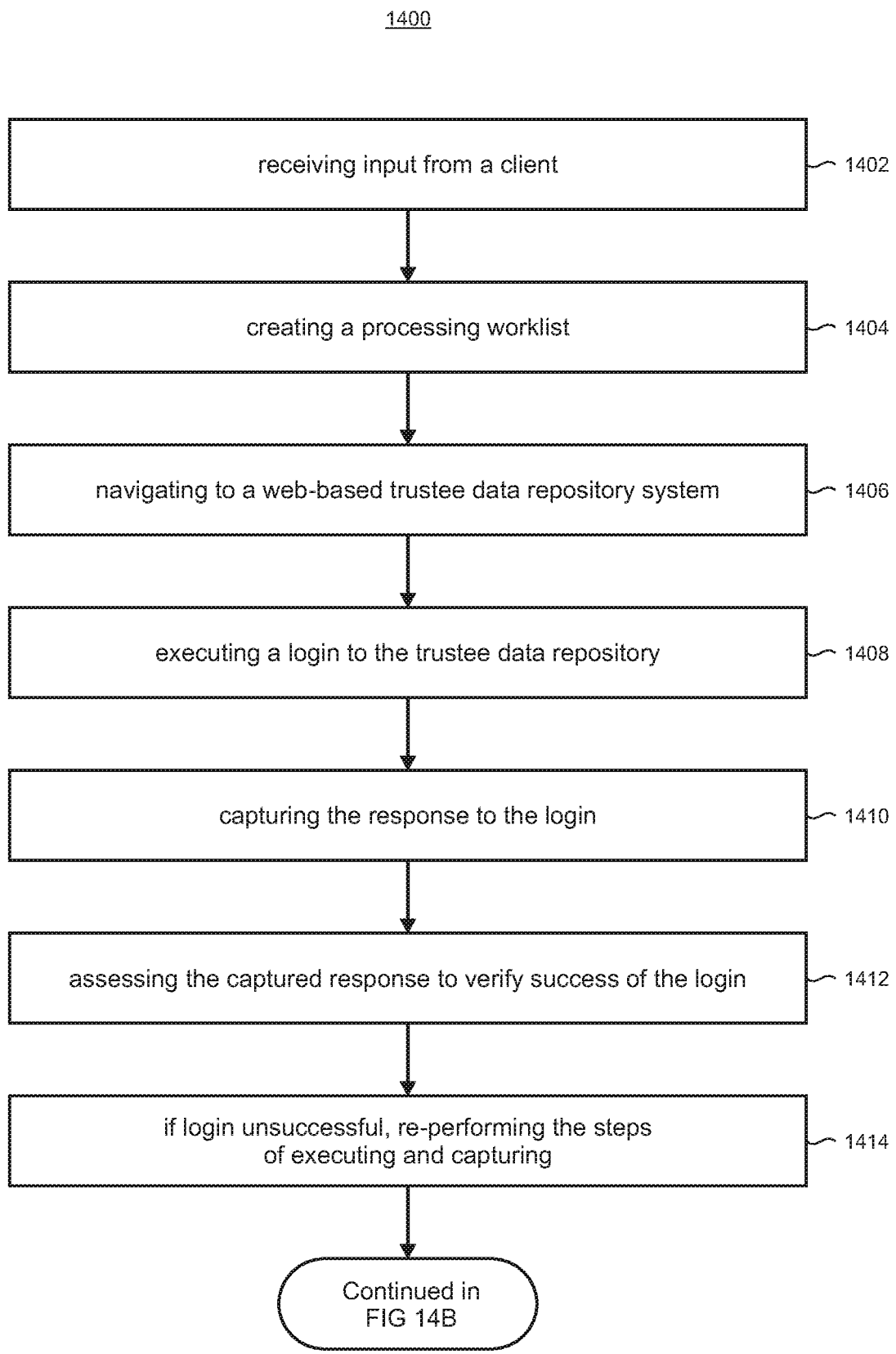

AUTOMATED TRUSTEE PAYMENTS SYSTEM

STATEMENT OF RELATED APPLICATION

This application claims the benefit of provisional patent application Ser. No. 62/137,569 entitled "Automated Trustee Payments System" filed Mar. 24, 2015.

BACKGROUND

The conventional processing of payments from Chapter 13 Trustees to a creditor can often be time-consuming and error prone due to the need to cross-reference numerous entries on a given remittance check to locate the correct loan and debtor loan data on the creditor's internal systems and properly identify the nature of the payment. New systems are desired to reduce a creditor's workload while improving accuracy and timeliness of the remittance processing and properly identify the nature of payment being remitted with regard to pre-petition indebtedness, post-petition payments, and/or applicable fees.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

The present automated trustee payments system implements a series of automated processes which significantly reduce, and in many cases, eliminate a creditor user's work that is required to accurately and timely process incoming Chapter 13 Trustee remittances. The automated trustee payments system also effects application of the funds to the proper bankrupt debtor accounts and accounts for the funds against the proper creditor's loan account segments (e.g., the bankruptcy estate pre-petition indebtedness, interest on a claim, or the post-petition ongoing payments).

In various illustrative examples, the automated trustee payments system enables automated logging of the check's receipt and tracking its disposition by capturing the salient check information from the minimum data amount required to be input, for example by retrieving, parsing, and storing the check voucher data automatically from the Trustees' data repository, and queuing it for processing.

The automated trustee payments system may further enable automated cross-referencing of each remittance item to internal loans using Trustee case record identifiers, avoiding the requirement for a user to make inquiries to the Trustees' data repository for each remittance item on the Trustee's check, or make inquiries to the creditor's loan system for each remittance item on the Trustee's check, or needing to compare the two systems' data and assess the cross-reference of the case and claim data elements against the possible loan data elements, or make a determination of the correct case-to-loan reference from the possible loans. For example, an automated system-to-system interface is typically implemented to retrieve each remittance item's case and claim information and to interface with and interrogate the user's loan system and to analyze and rate matches of case information to loan information based on multiple-system, multiple loan borrower and loan status based business rules, and queuing each remittance item for processing.

The automated trustee payments system may further enable automated determination of the proper application or alternate disposition of each remittance item to the proper loan account segment, avoiding the requirement for a user to analyze the Trustee's claim data to determine whether the remittance item is for a pre-petition plan payment, a post-petition ongoing loan payment, interest on the claim, or for a post-petition fee based on identifiers which are vague, ambiguous, and/or inadequate to effect proper determination, or needing to timely and correctly calculate claimed and ongoing loan fees and loan payments to be applied from the remittance items in combination with suspensed funds (from prior partial receipts). For example, an automated system-to-system interface may be implemented to interrogate the user's loan system to determine suspensed debtor funds, suspensed Trustee funds, claimed and unpaid fees, interest on claims, claimed and unpaid delinquent loan payments, unpaid post-petition fees, unpaid post-petition loan payments, analyzing the remittance item and its voucher descriptions along with Trustee case and claim information and making the calculation of fee and payment applications based on multiple-system, multiple loan borrower, loan status indicator and case/claim status indicator based business rules and queuing each item for further processing.

The automated trustee payments system may further enable automated routing, review, analysis, disposition, tracking and alternate-routine processing of exceptions in all categories, with re-entry to processing paths. For example, exception handling for out-of-balance checks or unretrieved checks is supported. In addition, the system supports an escalation feature so that any item presented to a user may be selected for an additional higher level reviews.

The automated trustee payments system may further enable automated application of each payment's component to each loan account, avoiding the requirement for a user to make multiple-step, often time-constrained multiple-day payment application entries to the loan account, or make update entries to the loan's ledger(s) for the pre-petition, post-petition, and full contractual loan histories. For example, an automated system-to-system interface may be implemented to execute payment and update transactions to the user's loan system and alternate application exception re-processing of payment application transactions due to post-analysis pre-application loan system status changes based on business rules. Such interface can advantageously enable automated handling of conflicting activities.

The automated trustee payments system may further enable automated support of daily remittance balancing, avoiding manual batch tallies and control log entries. The automated trustee payments system may further enable automated handling of transactions involving inter-company fund transfers to areas associated with portfolios that are typically handled separately and funds returns that are determined not be processed by any area.

The automated trustee payments system may further enable automated tracking of the each remittance item's disposition, avoiding the manual entry of all the remittance advice information (e.g., by only entering a check number, amount, date, and payor).

The automated trustee payments system may further enable self-check and follow-up when a voucher entry disposition includes one or more payment applications to ensure proper post-application loan condition and status are verified, and exceptions are presented to the user for disposition or further processing, for example, by decision or additional entries.

The automated trustee payments system may further implement a self-learning function in which, as exceptions are resolved and/or as actions are validated, the system "learns" the characteristics of the payment (pre-/post-/fees, cross-referenced system/loan and application route) and, based on the user's configuration, applies the end-state to the next processing of a payment for the same case and claim with the same identifiers, thus eliminating redundant handling of exceptions or validations. The configuration supports a multiple-affirmation threshold limit before auto-applying the prior decision. Prior to the satisfaction of the threshold, the system will present the subsequent exception or validation items with the prior dispositions noted for reference. If the threshold has not been met and a subsequent user action contradicts a prior, then the user is presented with a decision—reset prior event learning for the case/claim remittance item or a one-time variance and don't count against the threshold.

The automated trustee payments system may further implement user-configurable review-level threshold settings, auto-processing thresholds and secondary-review settings. This feature enables the remittance items to be, based on characteristics, routed for human review only when needed based on variable characteristics and further enables management control of changes, deviations from tolerances, and the like.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure.

DESCRIPTION OF THE DRAWINGS

FIGS. 14A, 14B, 14C and 14D show a flowchart of a second illustrative method in which remittance checks from a bankruptcy trustee are processed and associated details are retrieved;

Like reference numerals indicate like elements in the drawings. Elements are not drawn to scale unless otherwise indicated.

DETAILED DESCRIPTION

Figure 1:
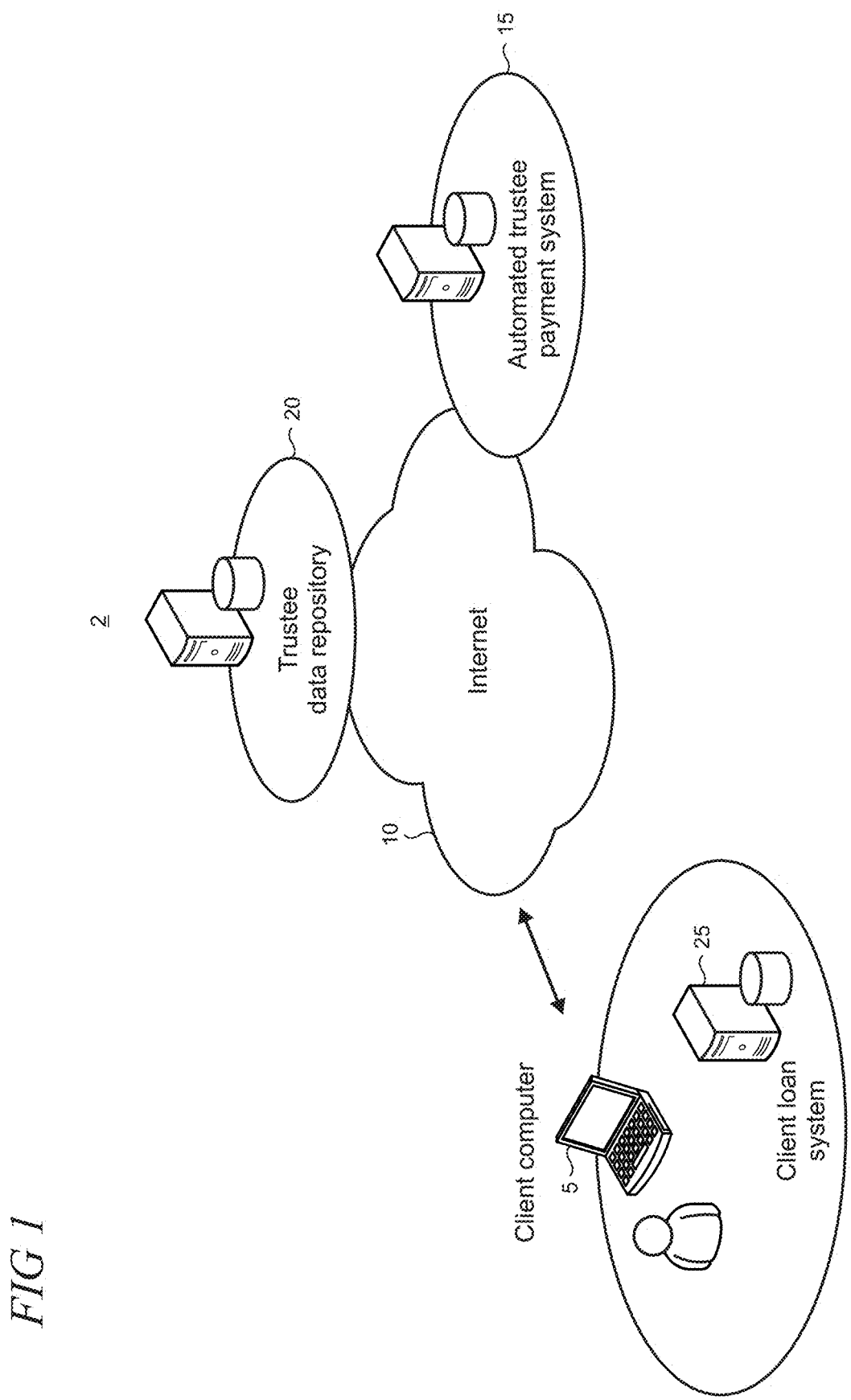
FIG. 1 shows an illustrative computing environment in which the present automated trustee payments system may be implemented.

FIG. 1 shows an illustrative computing environment 2 in which the present automated trustee payments system may be implemented. The environment includes a client computer 5 that is operatively connected to a network such as the Internet 10. The Internet connection facilitates communication with an automated trustee payments system 15 that exposes various features, capabilities, and functionalities via web services to the client computer 5. A trustee data repository 20, for example a National Data Center site, a client loan system 25, and a remote database 27 are also located in the computing environment 2, as shown.

Figure 2A:
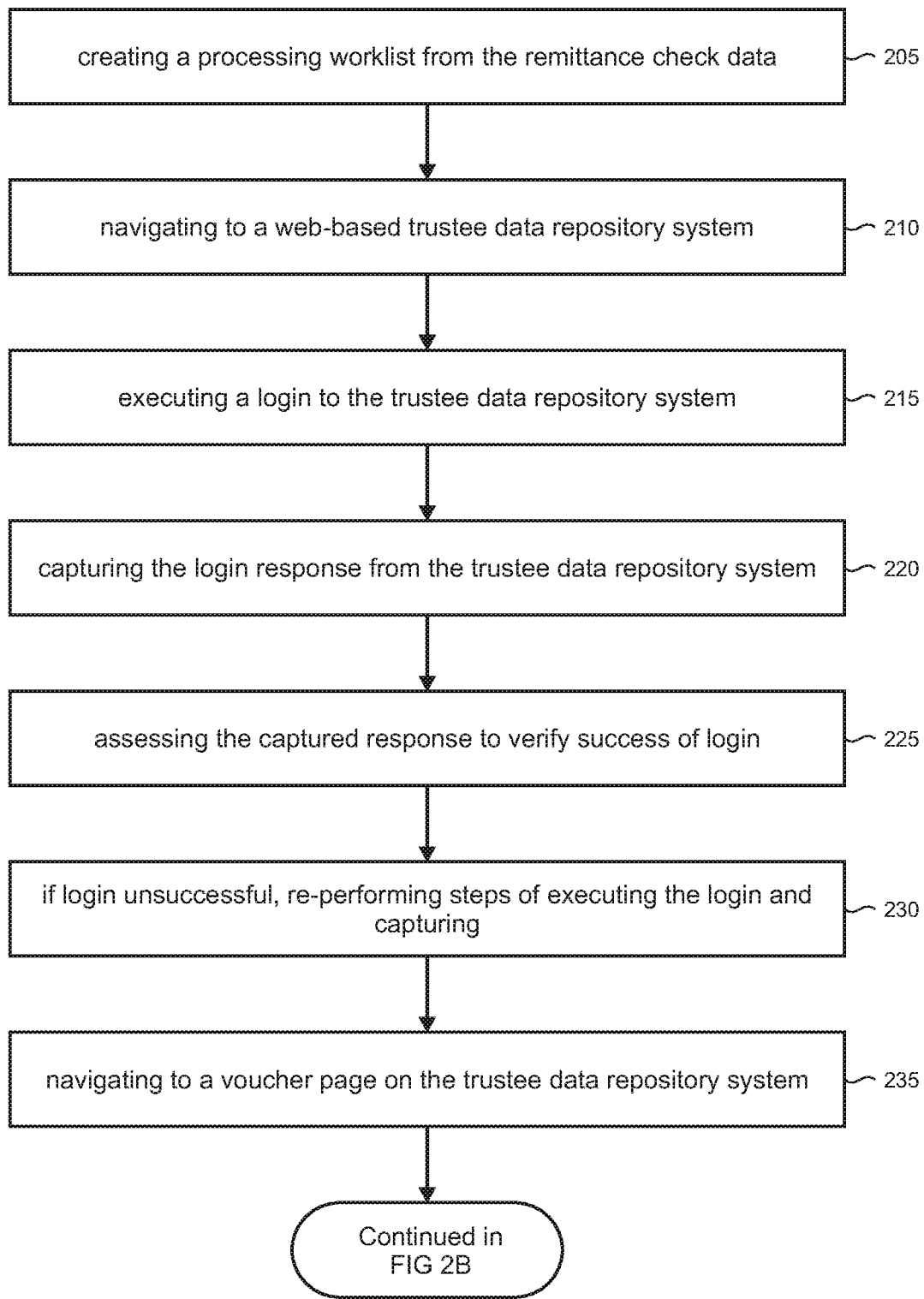
FIGS. 2A, 2B and 2C show a flowchart of a first illustrative method in which remittance checks from a bankruptcy trustee are processed.
Figure 2B:
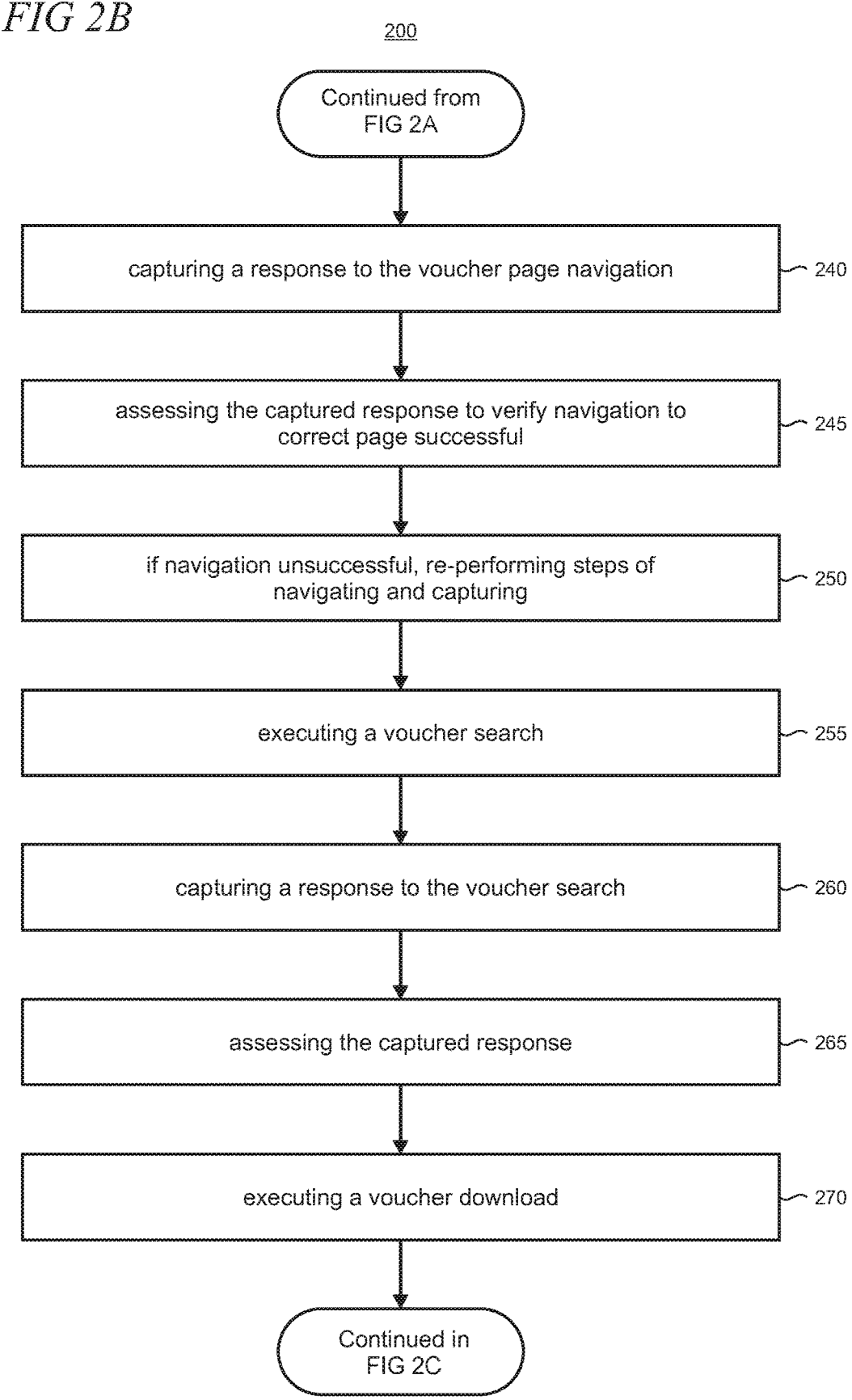
Figure 2C:
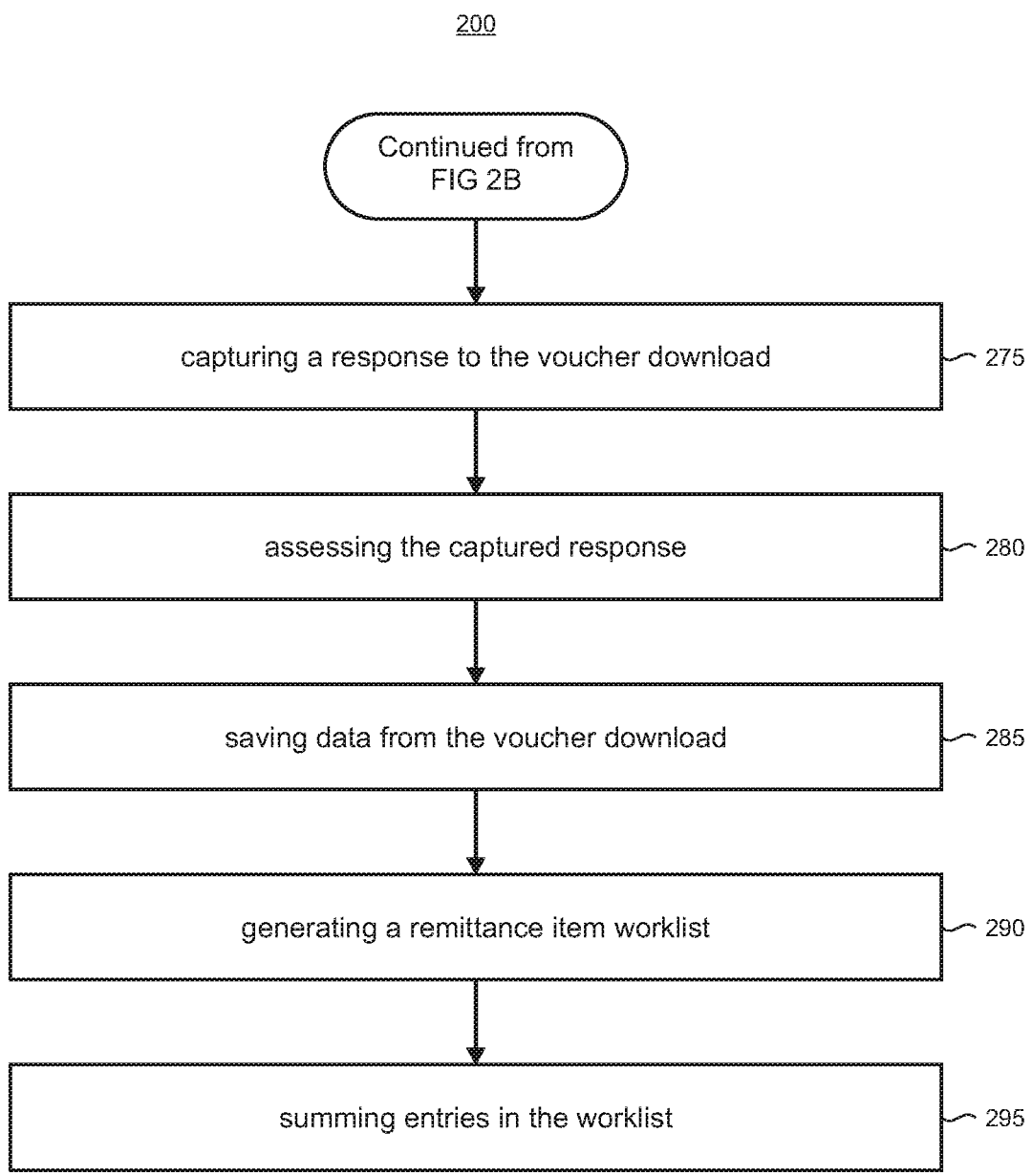
Figure 3:
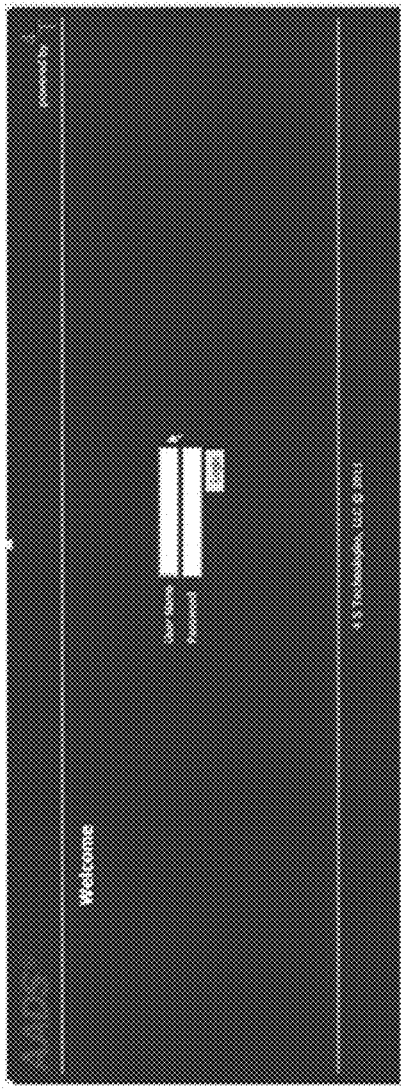
FIGS. 3-13 show various illustrative screen captures of sources of information that are accessed as the first illustrative method is practiced.
Figure 4:
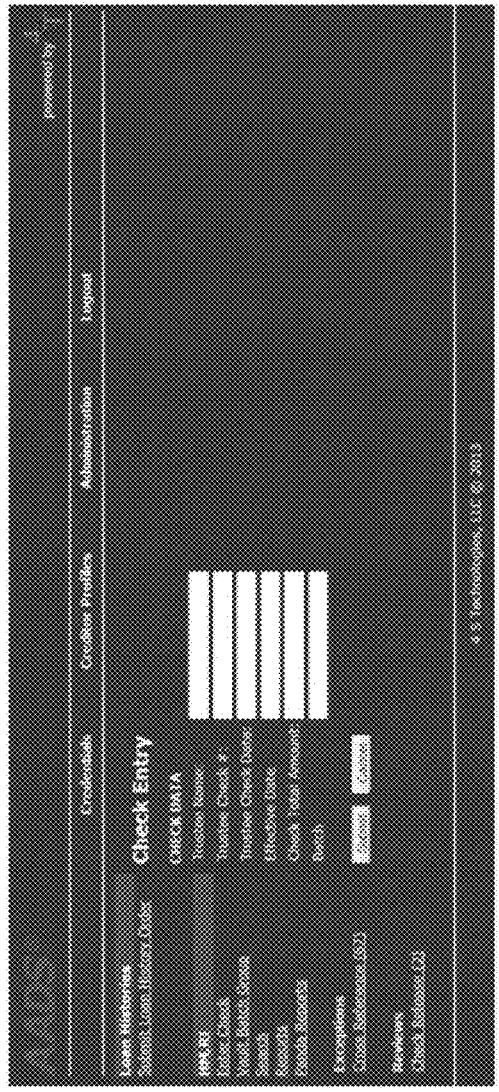
Figure 5:
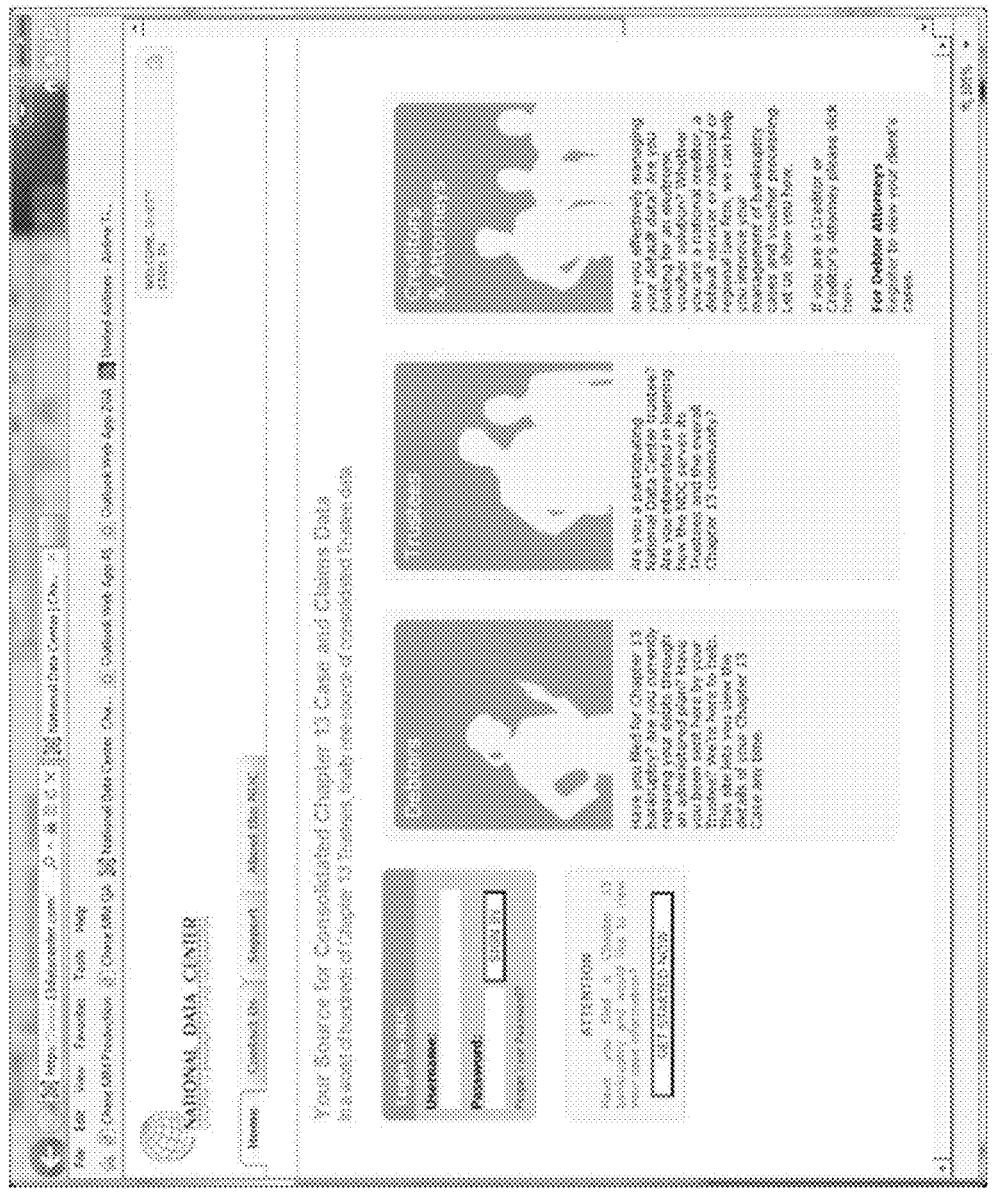
Figure 6:
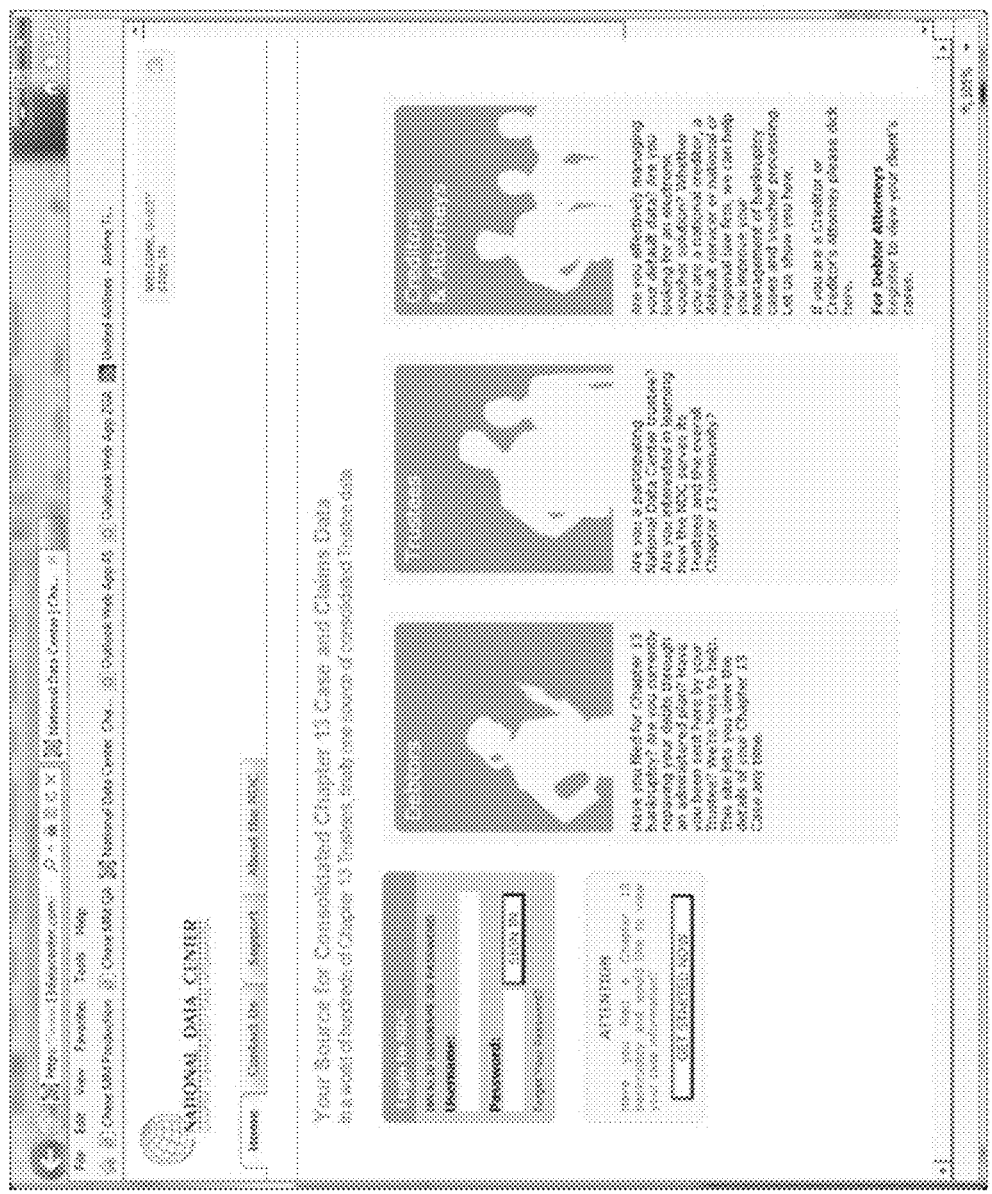
Figure 7:
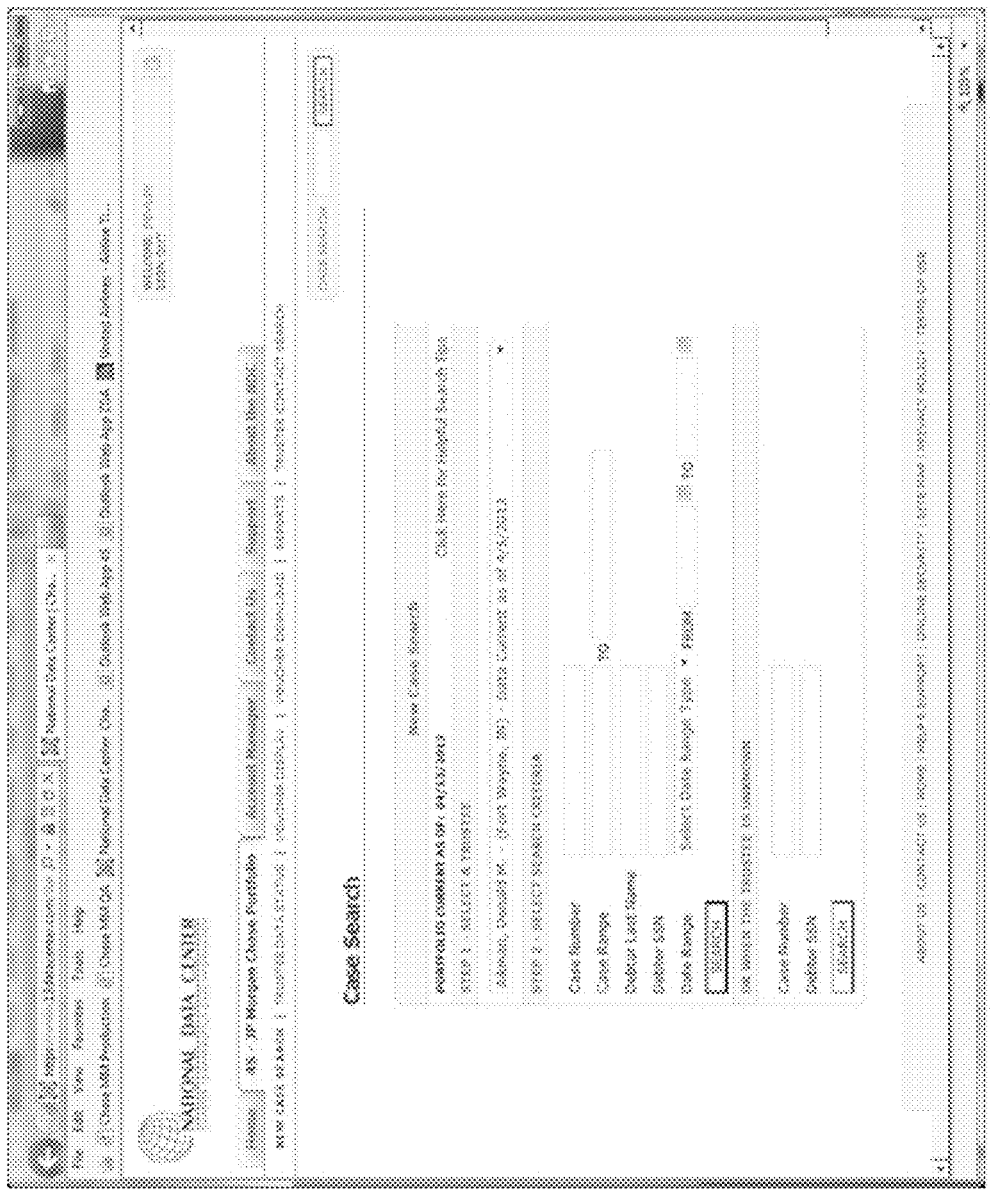
Figure 8:
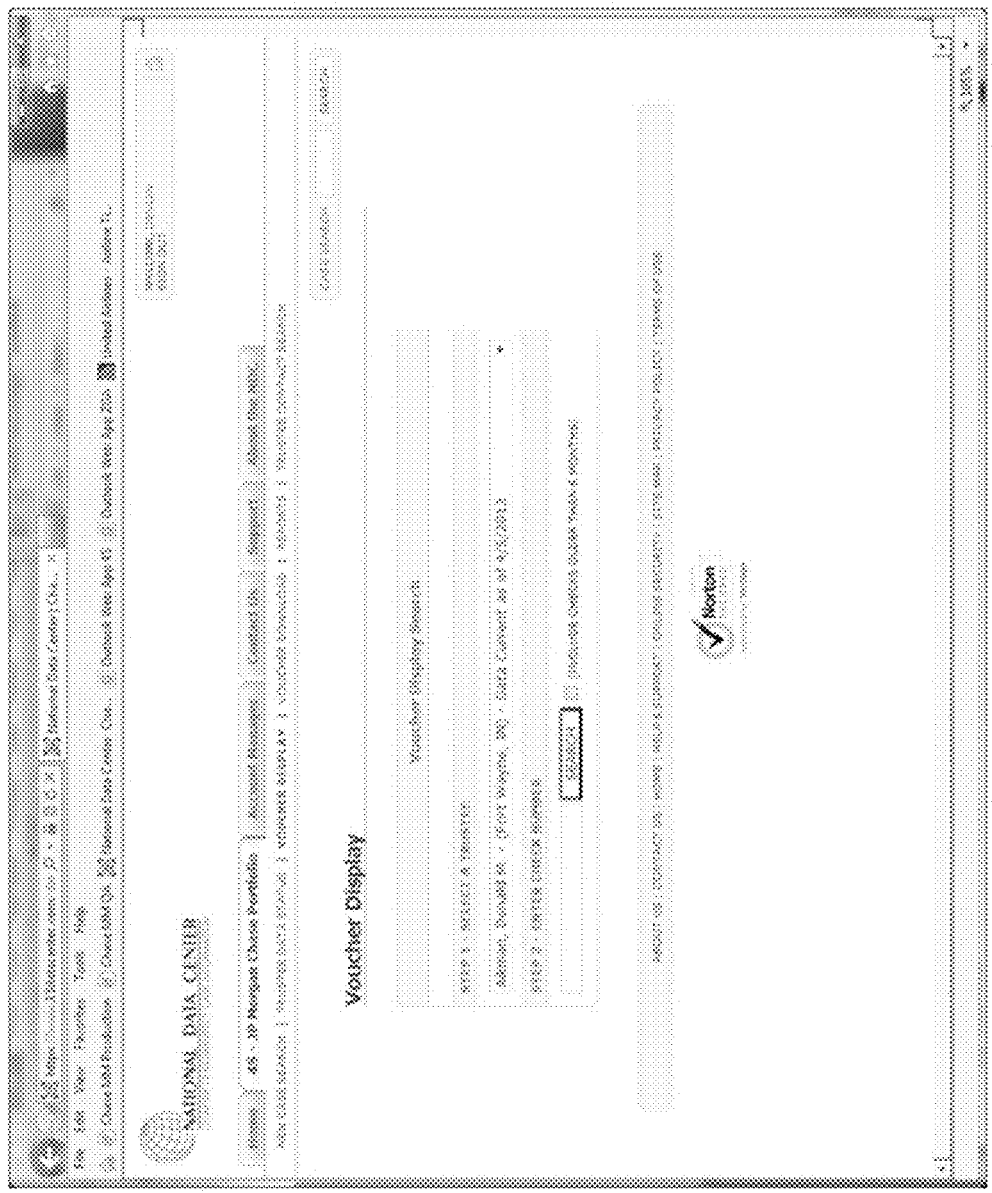
Figure 9:
Figure 10:
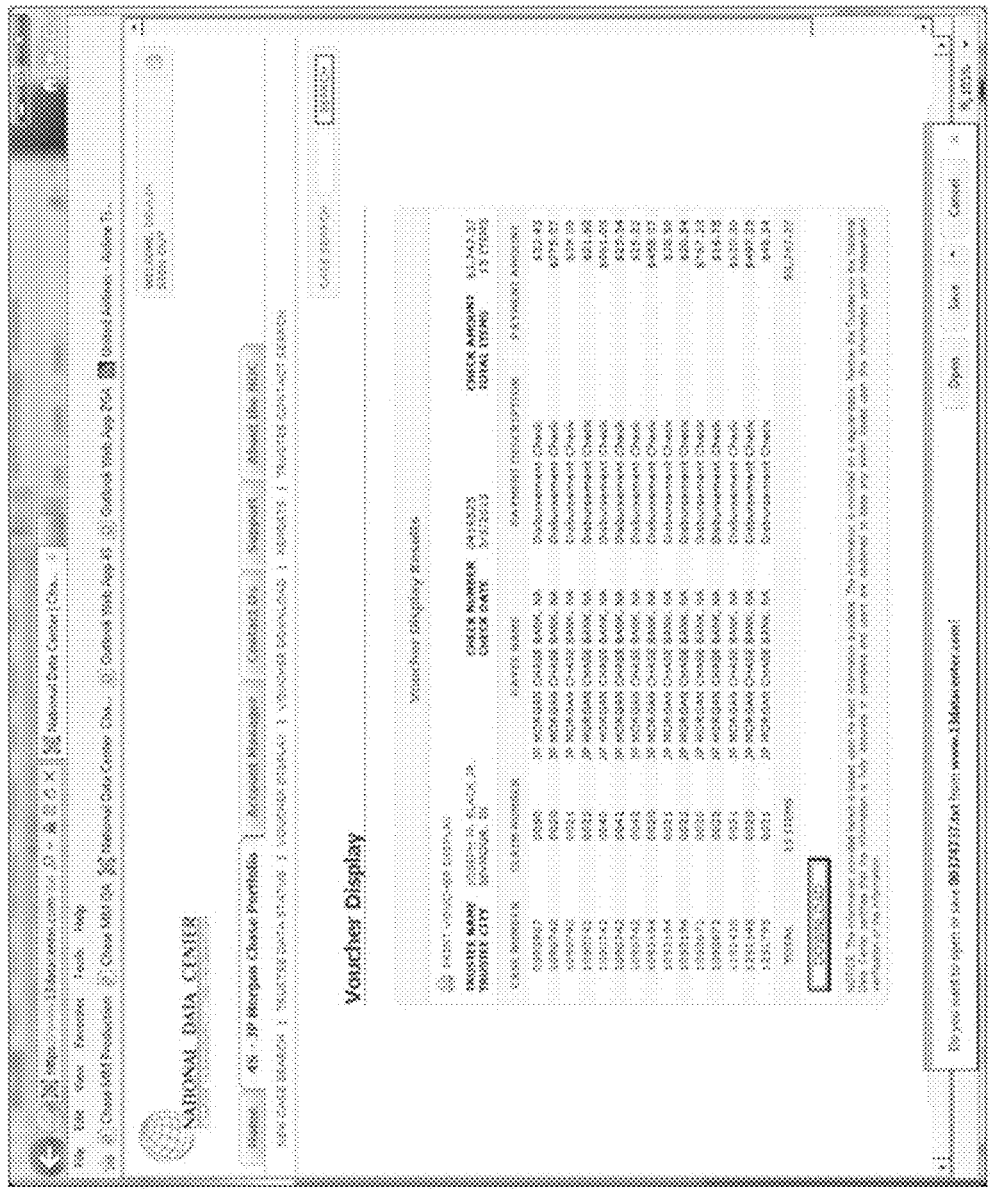
Figure 11:
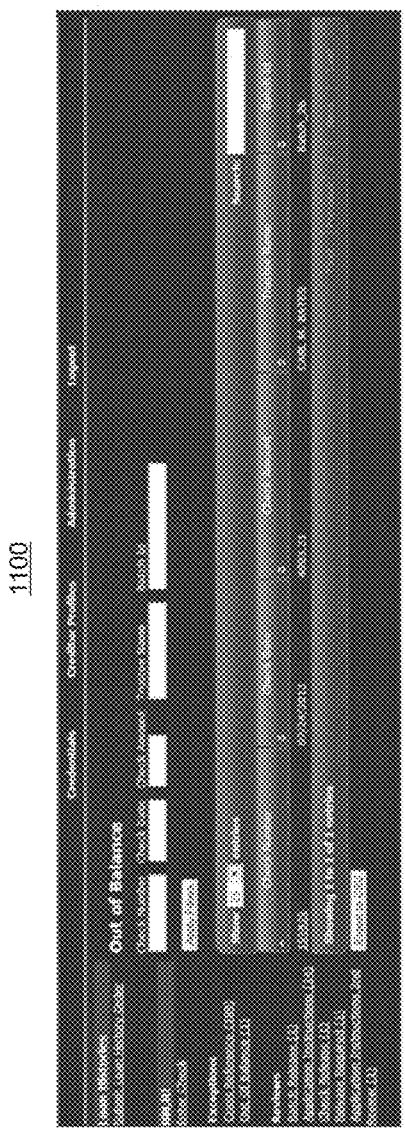
Figure 12:
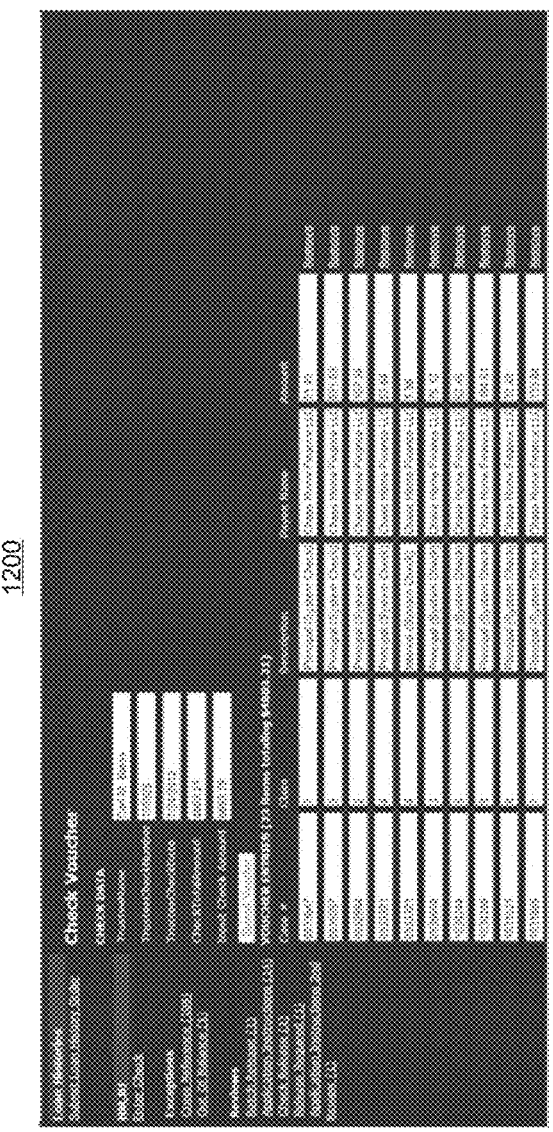
Figure 13:
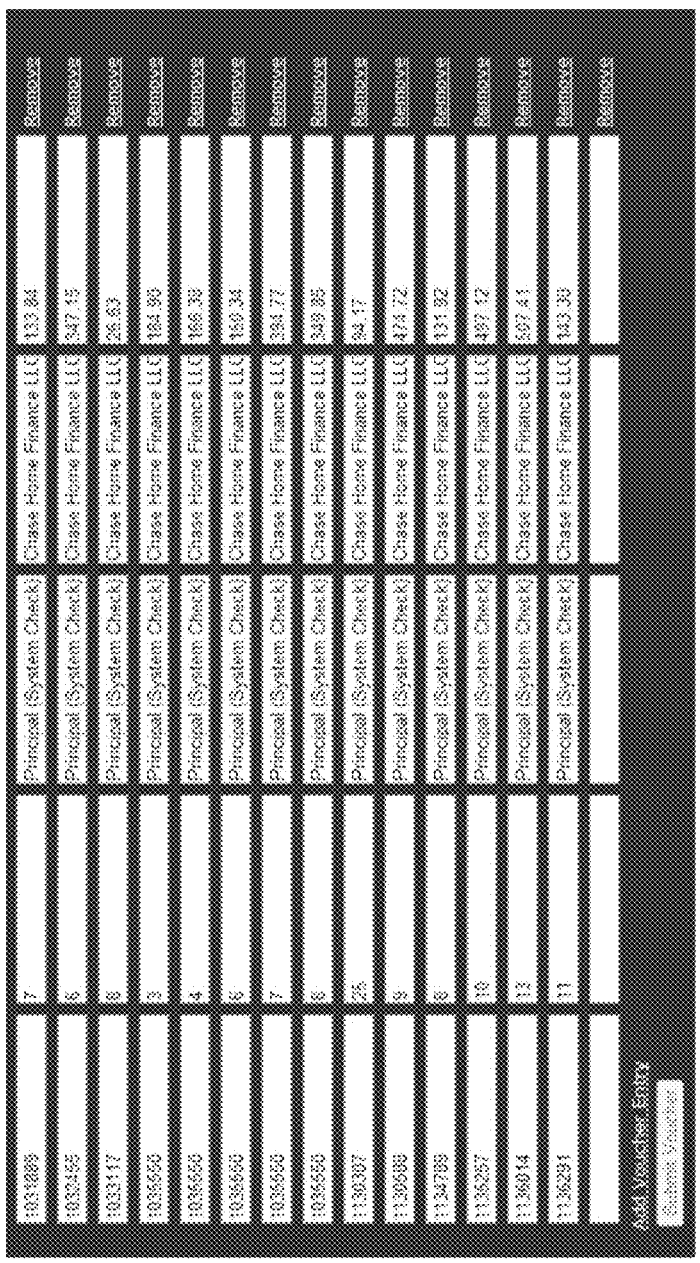
Figure 14B:
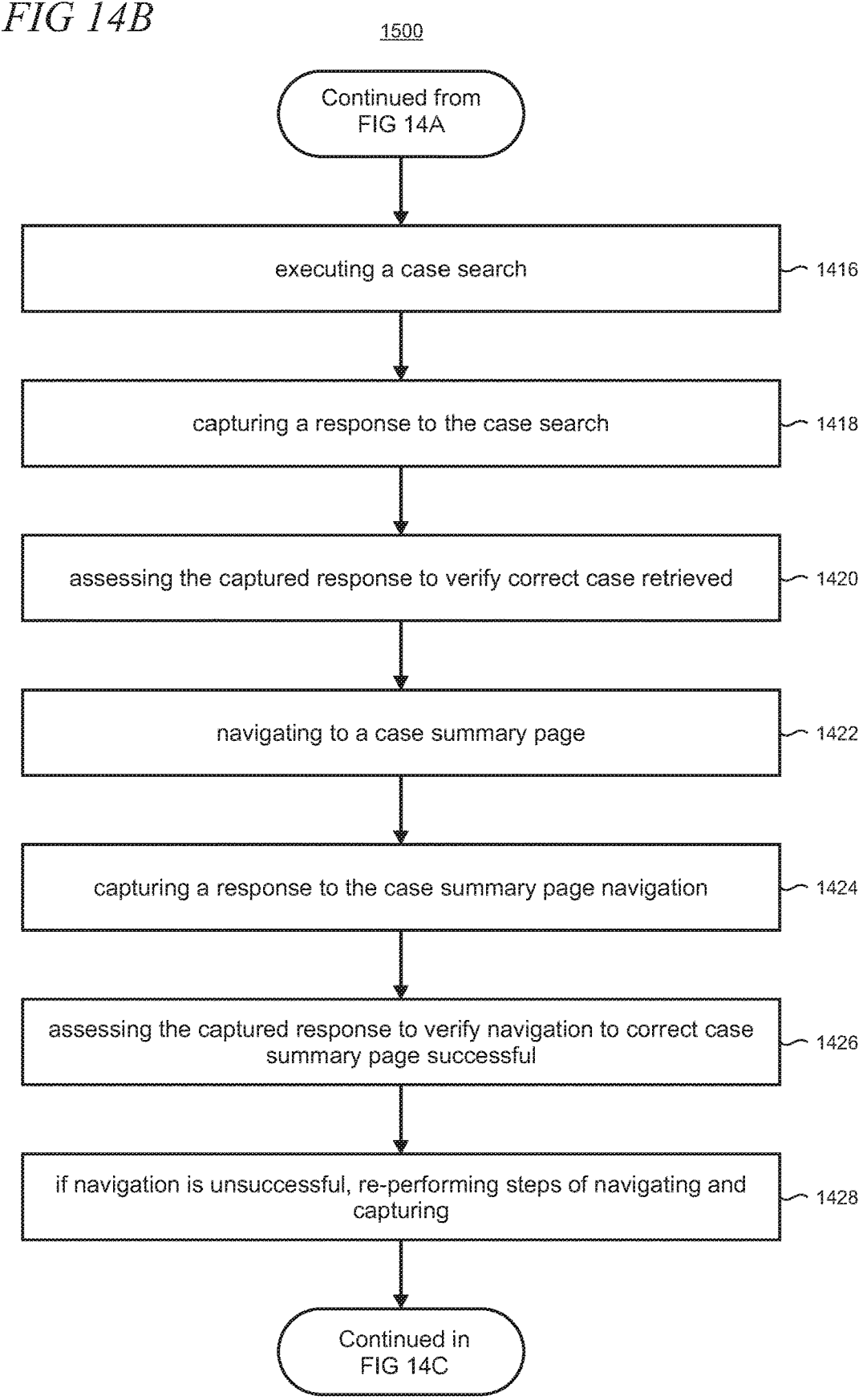
Figure 14C:
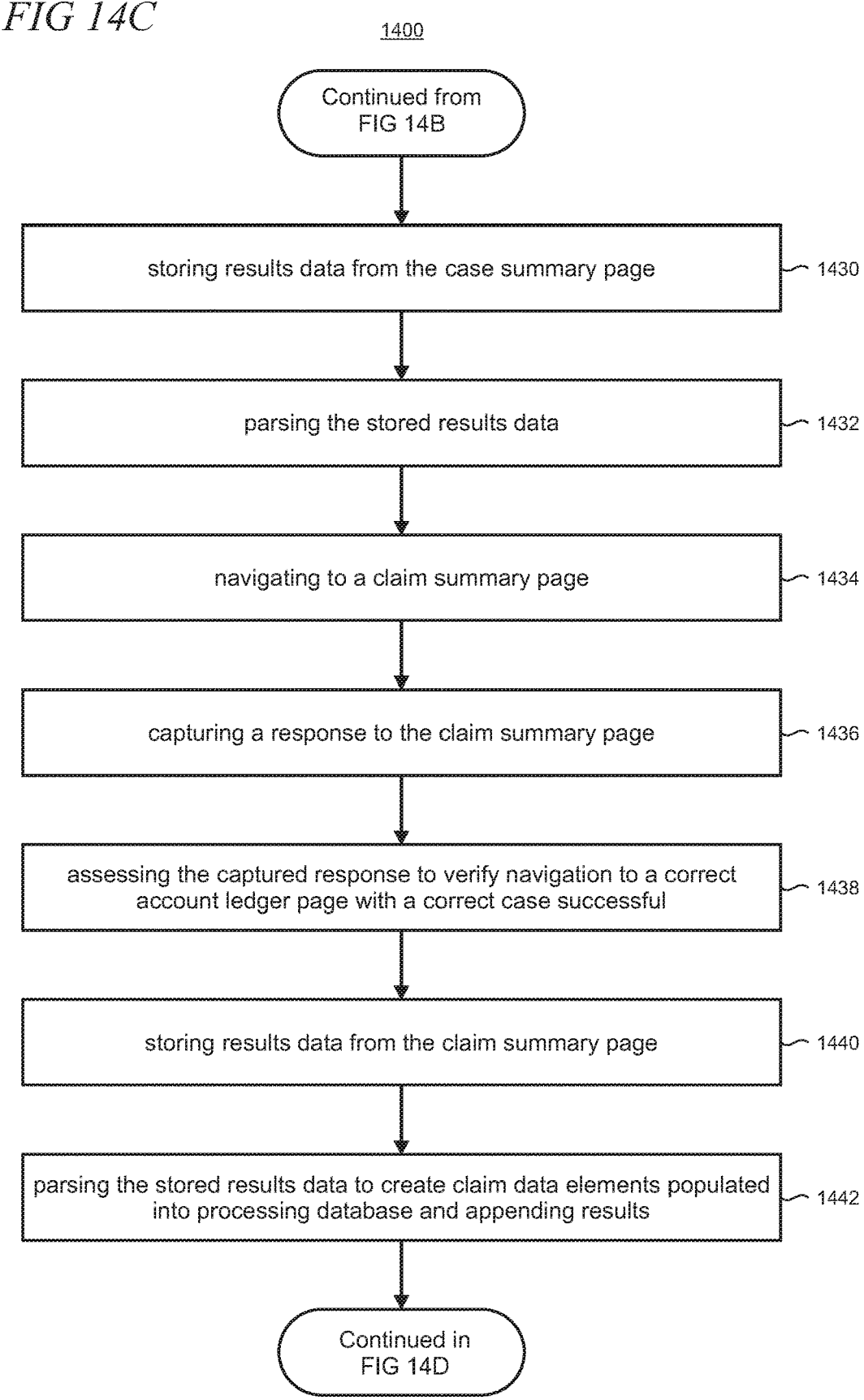
Figure 14D:
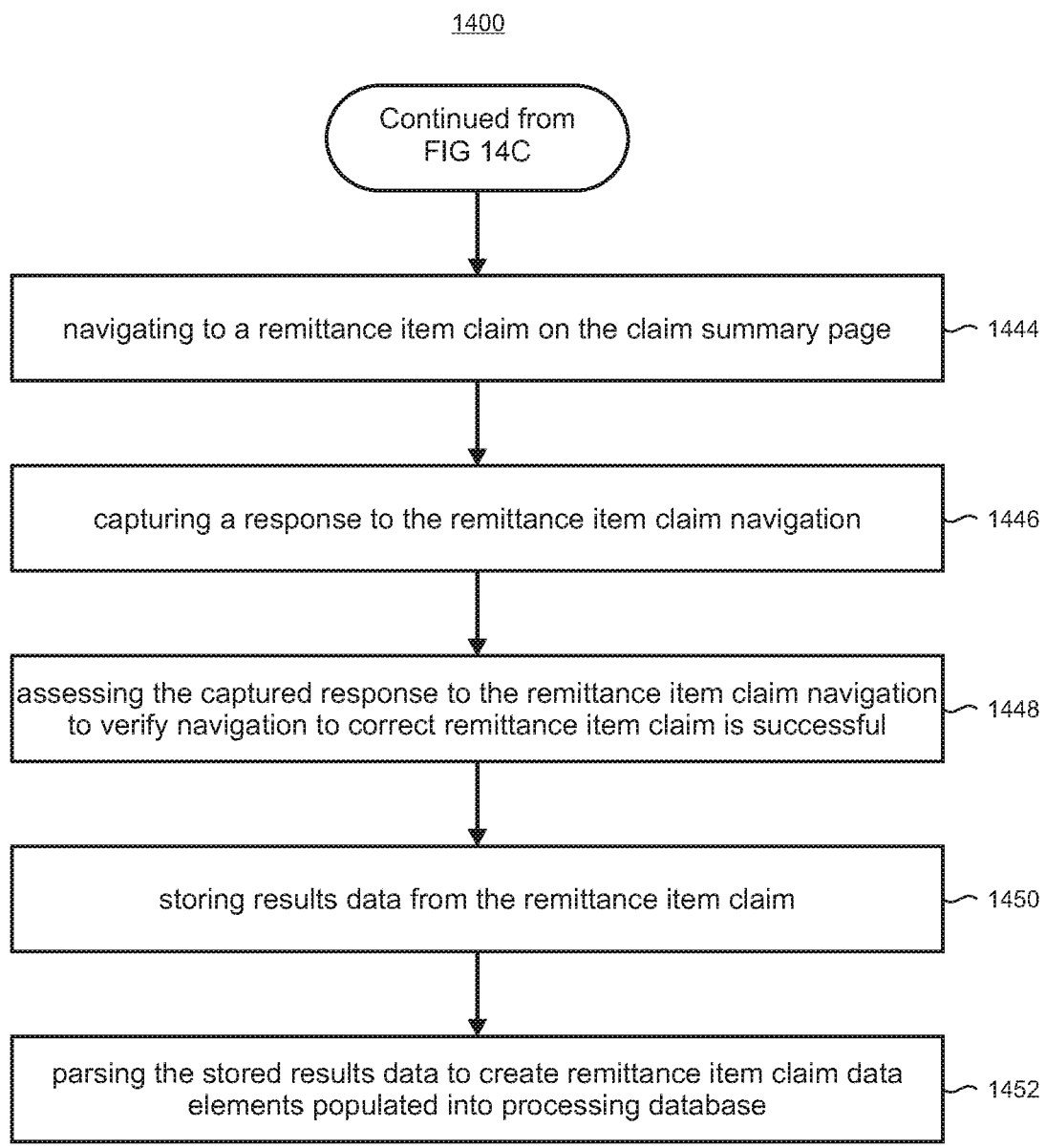
Figure 15:
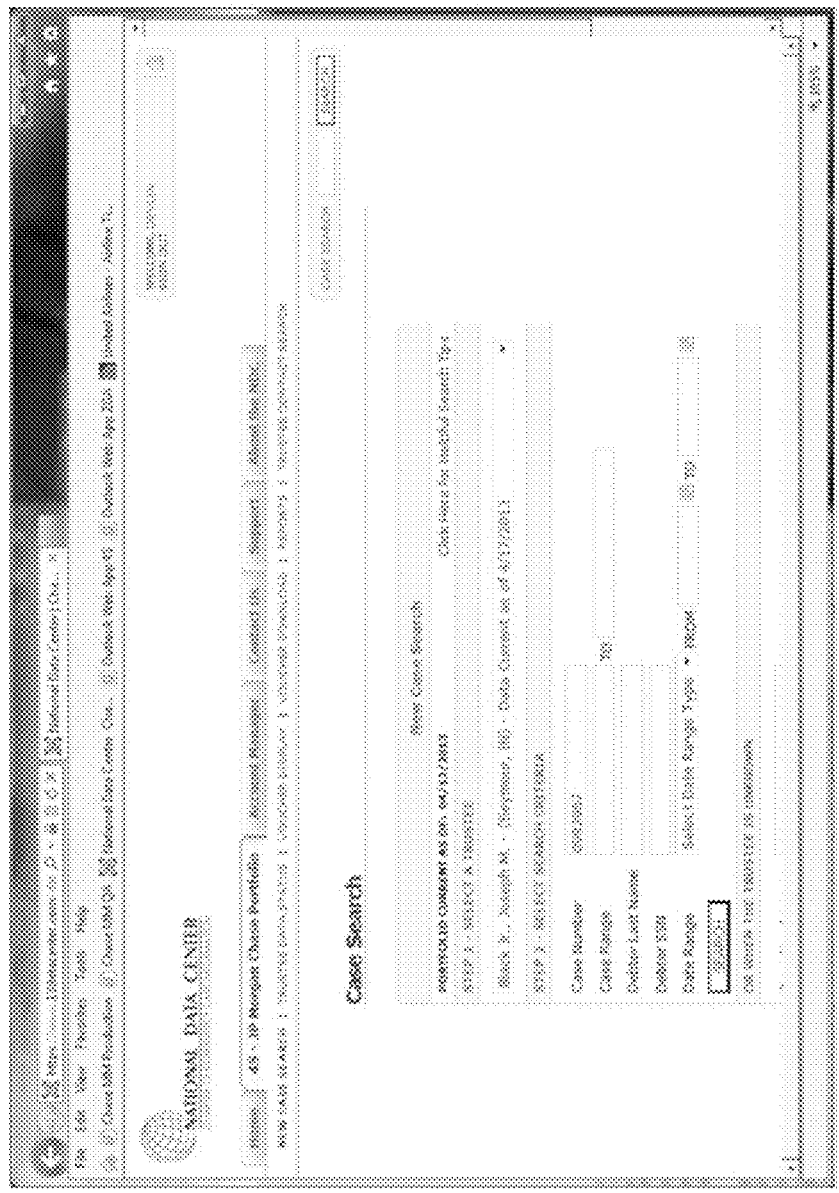
FIGS. 15-20 show various illustrative screen captures of sources of information that are accessed as the second illustrative method is practiced.
Figure 16:
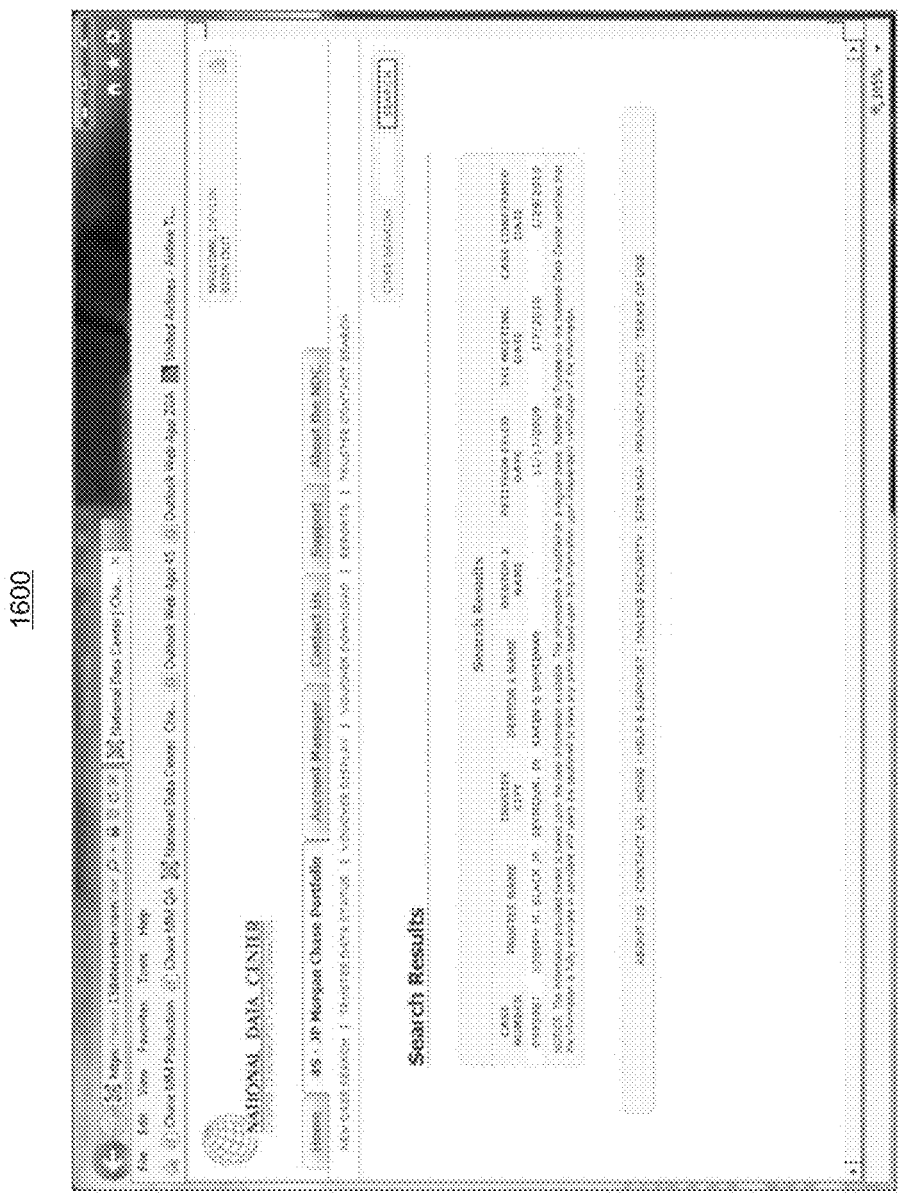
Figure 17:
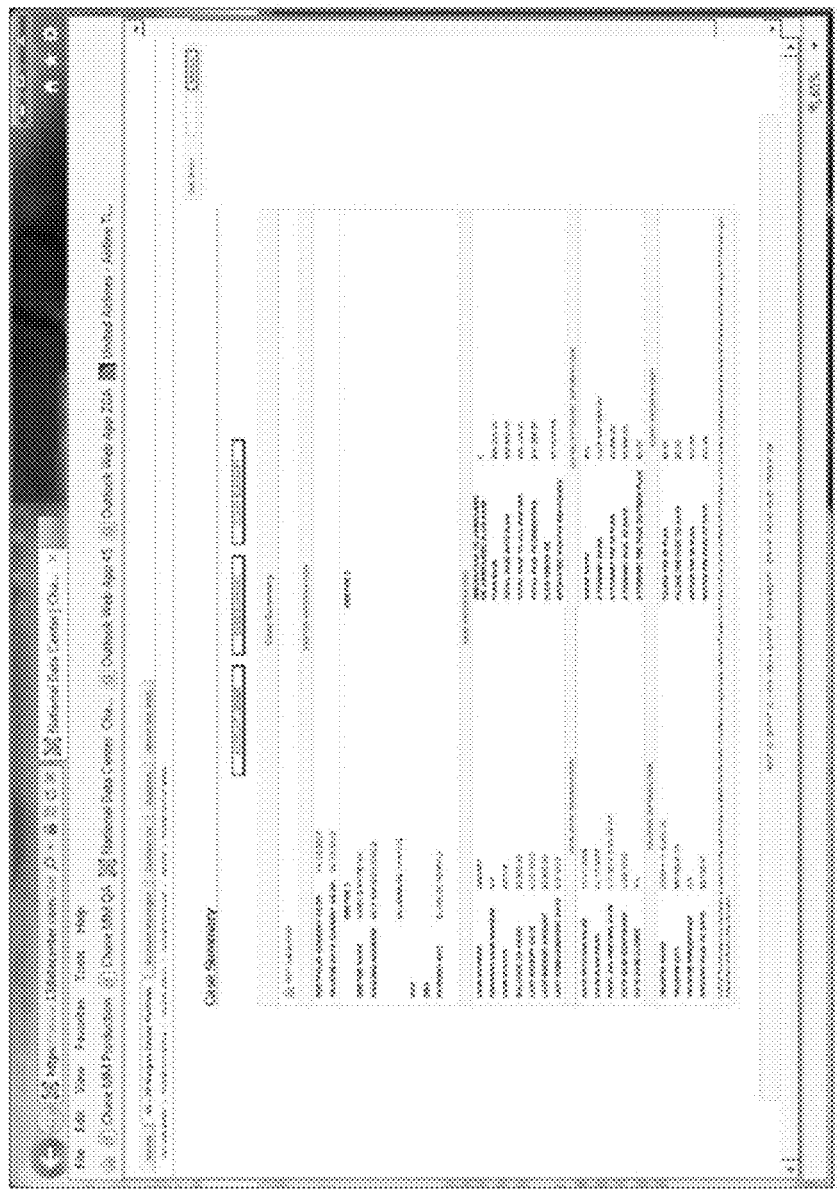
Figure 18:
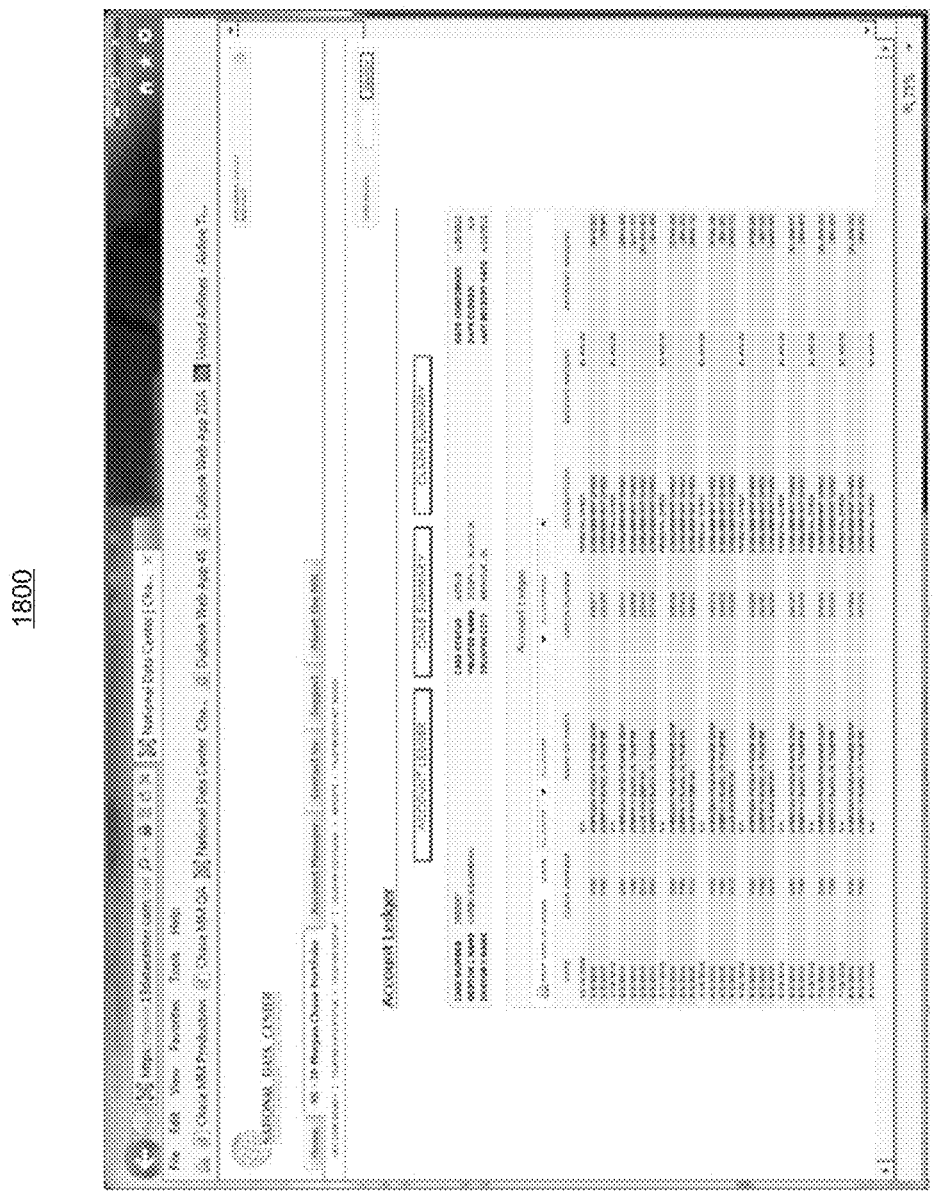
Figure 19:
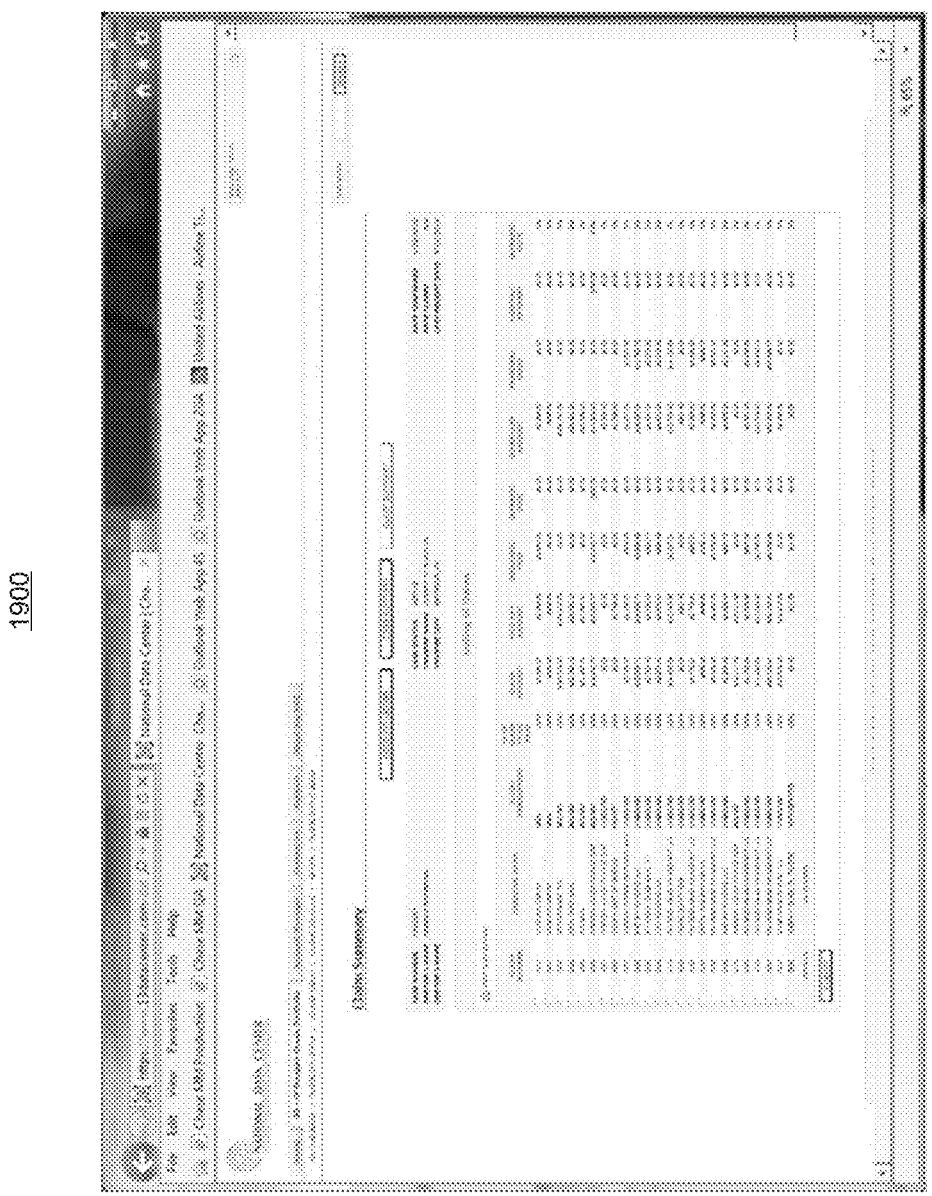
Figure 20:
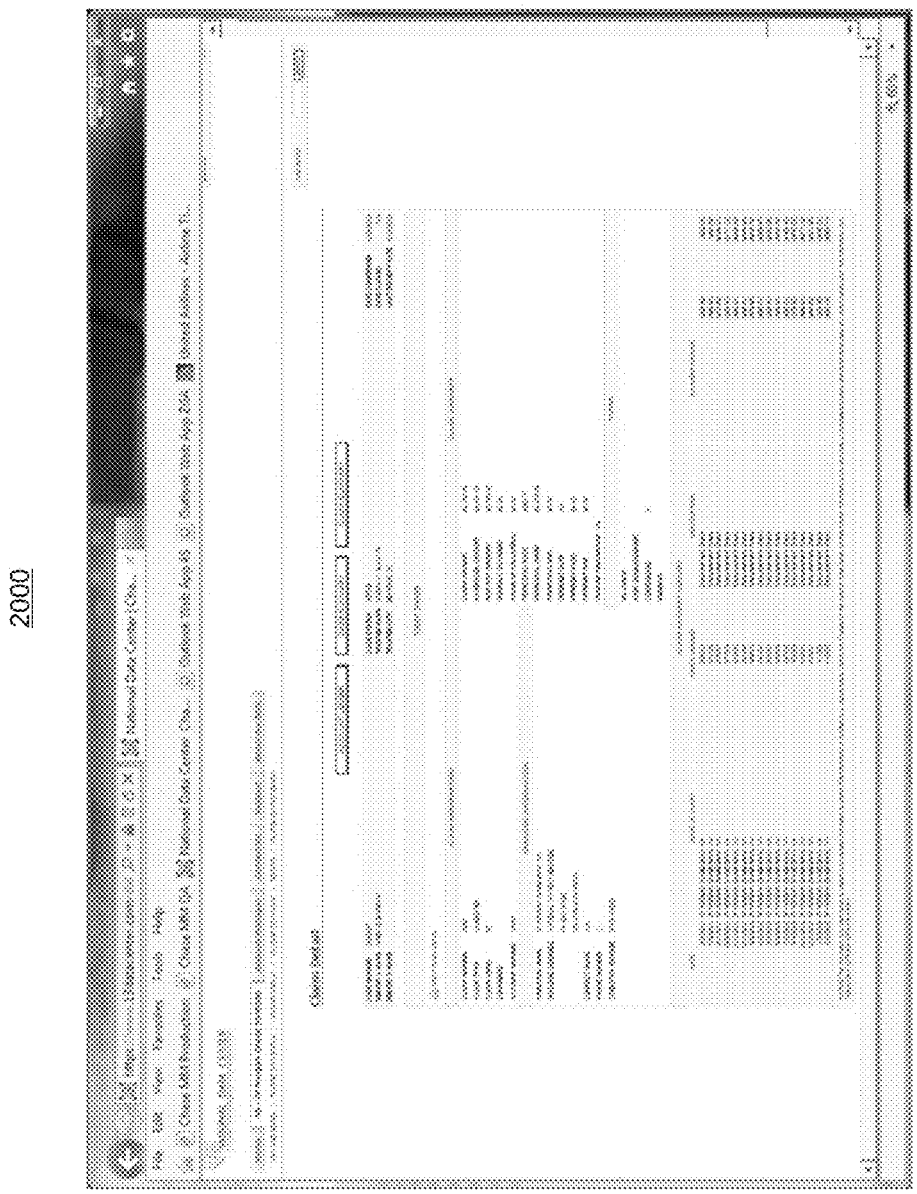

The present automated trustee payments system is further described in the flowcharts and screen captures shown in the drawings. More particularly, FIGS. 2A, 2B and 2C show a flowchart of a first illustrative method 200 in which remittance checks from a bankruptcy trustee are processed. Unless specifically stated, the methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Step 205 in method 200 comprises creating a processing worklist from the remittance check data. Step 210 comprises navigating to a web-based trustee data repository system. Step 215 comprises executing a login to the trustee data repository system. Step 220 comprises capturing the login response from the trustee data repository system. Step 225 comprises assessing the captured response to verify success of the login.

If the login is unsuccessful, then step 230 comprises re-performing the steps of executing and capturing the login. Step 235 comprises navigating to a voucher page on the trustee data repository system. Step 240 comprises capturing a response to the voucher page navigation. Step 245 comprises assessing the captured response to verify that the navigation to the correct page was successful.

If the navigation was unsuccessful, then step 250 comprises re-performing the steps of if navigation unsuccessful, re-performing steps of navigating to the voucher page and capturing the response. Step 255 comprises executing a voucher search. Step 260 comprises capturing a response to the voucher search. Step 265 comprises assessing the captured response. Step 270 comprises executing a voucher download.

Step 270 comprises capturing a response to the voucher download. Step 280 comprises assessing the captured response. Step 285 comprises saving data from the voucher download. Step 290 comprises generating a remittance item worklist and step 295 comprises summing entries in the worklist.

FIGS. 3-13 respectively show various illustrative screen captures 300, 400, 500, 600, 700, 800, 900, 1000, 1100, 1200, and 1300 of sources of information that are accessed as the first illustrative method 200 described above is practiced.

FIGS. 14A, 14B, 14C and 14D show a flowchart of a second illustrative method 1400 in which remittance checks from a bankruptcy trustee are processed and associated details are retrieved. Step 1402 comprises receiving input from a client. Step 1404 comprises creating a processing worklist. Step 1406 comprises navigating to a web-based trustee data repository system. Step 1408 comprises executing a login to the trustee data repository. Step 1410 comprises capturing the response to the login. Step 1412 comprises assessing the captured response to verify the success of the login. If the login was unsuccessful, the step 1414 comprises re-performing the steps of executing and capturing the login.

Step 1416 comprises executing a case search. Step 1418 comprises capturing a response to the case search. Step 1420 comprises assessing the captured response to verify that the correct case was retrieved. Step 1422 comprises navigating to a case summary page. Step 1424 comprises capturing a response to the case summary page navigation. Step 1426 comprises assessing the captured response to verify that the navigation to the correct case summary page was successful. If navigation was unsuccessful, then step 1428 comprises re-performing the steps of navigating to the case summary page and capturing the response.

Step 1430 comprises storing results data from the case summary page. Step 1432 comprises parsing the stored results data. Step 1434 comprises navigating to a claim summary page. Step 1436 comprises capturing a response to the claim summary page. Step 1438 comprises assessing the captured response to verify that navigation to a correct account ledger page with a correct case was successful. Step 1440 comprises storing results data from the claim summary page. Step 1442 comprises parsing the stored results data to create claim data elements populated into processing database and appending results.

Step 1444 comprises navigating to a remittance item claim on the claim summary page. Step 1446 comprises capturing a response to the remittance item claim navigation. Step 1448 comprises assessing the captured response to the remittance item claim navigation to verify that navigation to correct remittance item claim was successful. Step 1450 comprises storing results data from the remittance item claim and step 1452 comprises parsing the stored results data to create remittance item claim data elements populated into processing database.

FIGS. 15-20 respectively show various illustrative screen captures 1500, 1600, 1700, 1800, 1900, and 2000 of sources of information that are accessed as the second illustrative method 1400 described above is practiced.

Figure 21A:
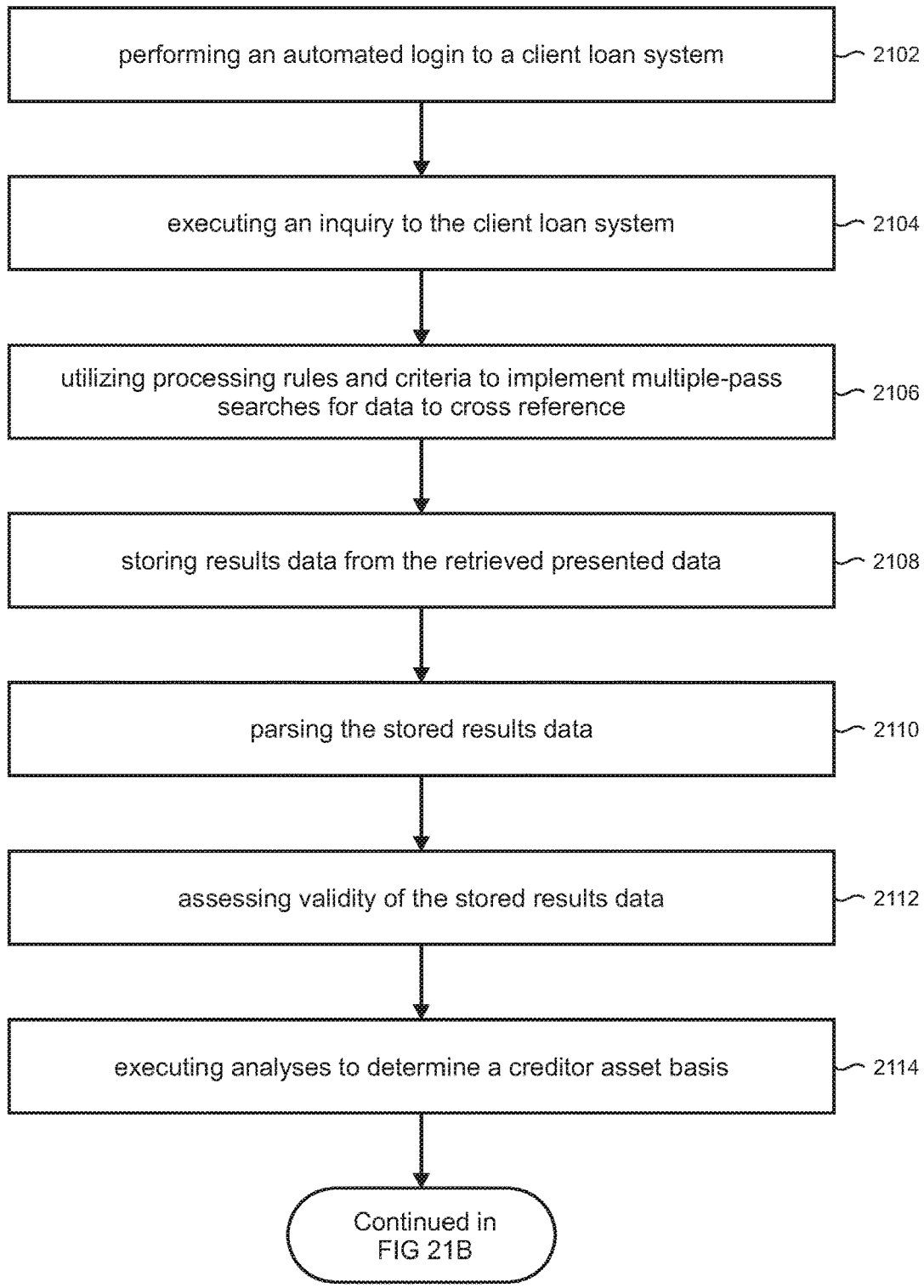
FIGS. 21A and 21B show a flowchart of a third illustrative method in which data is retrieved from a client loan system and processed.
Figure 21B:
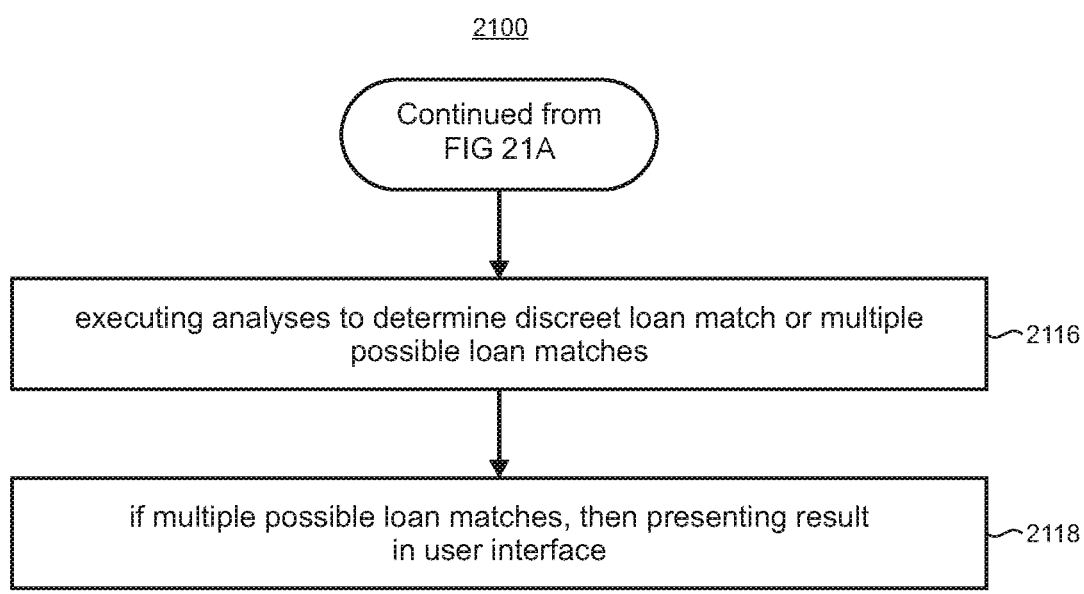
Figure 22:
FIGS. 22-26 show various illustrative screen captures of user interfaces that are displayed on a client computer as the third illustrative method is practiced.
Figure 23:
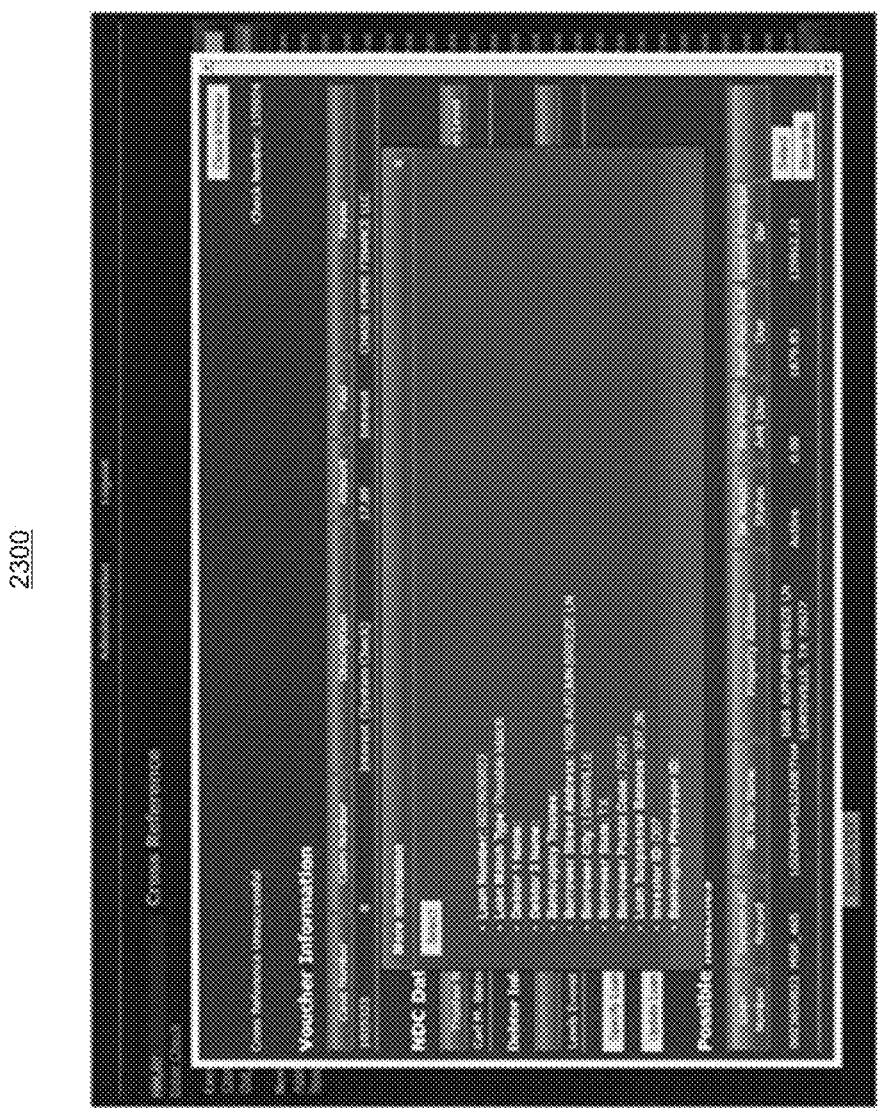
Figure 24:
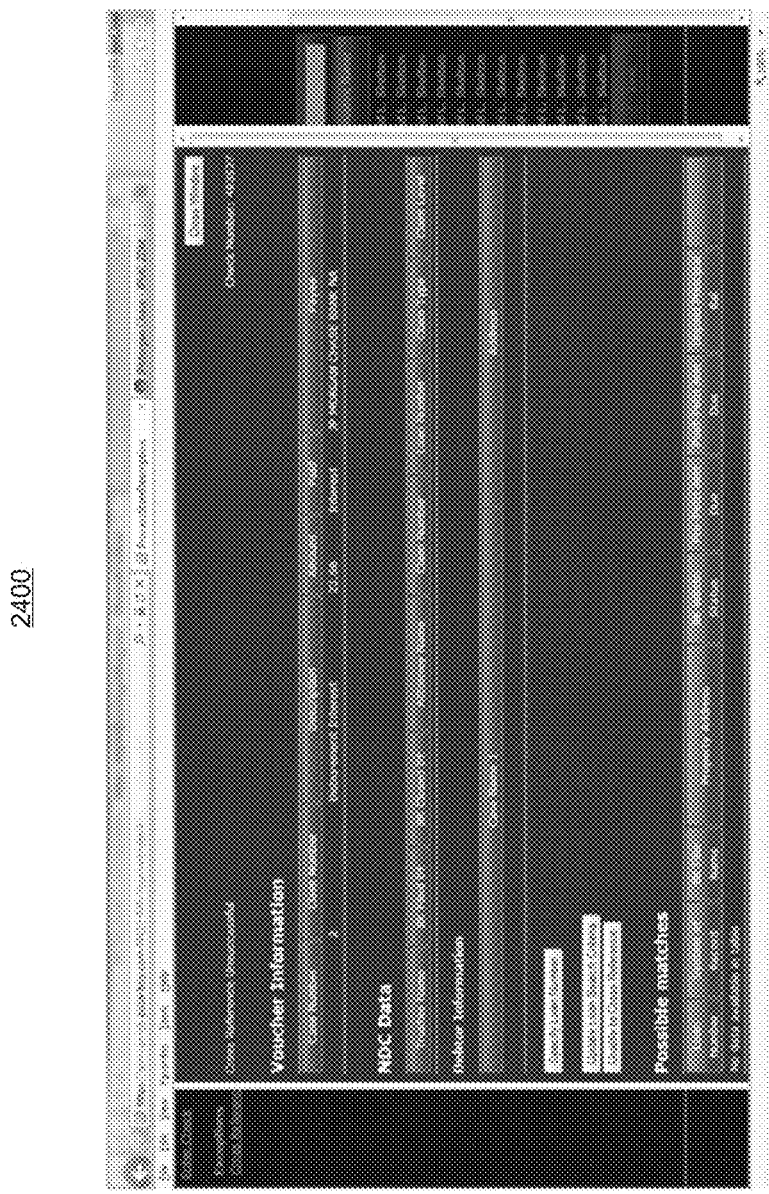
Figure 25:
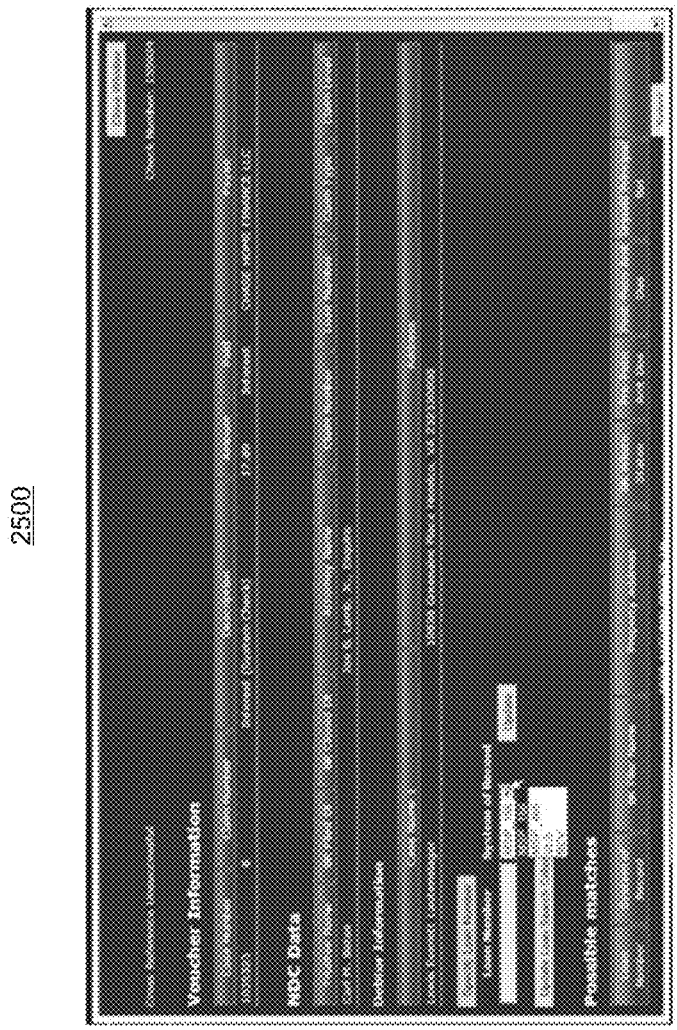
Figure 26:
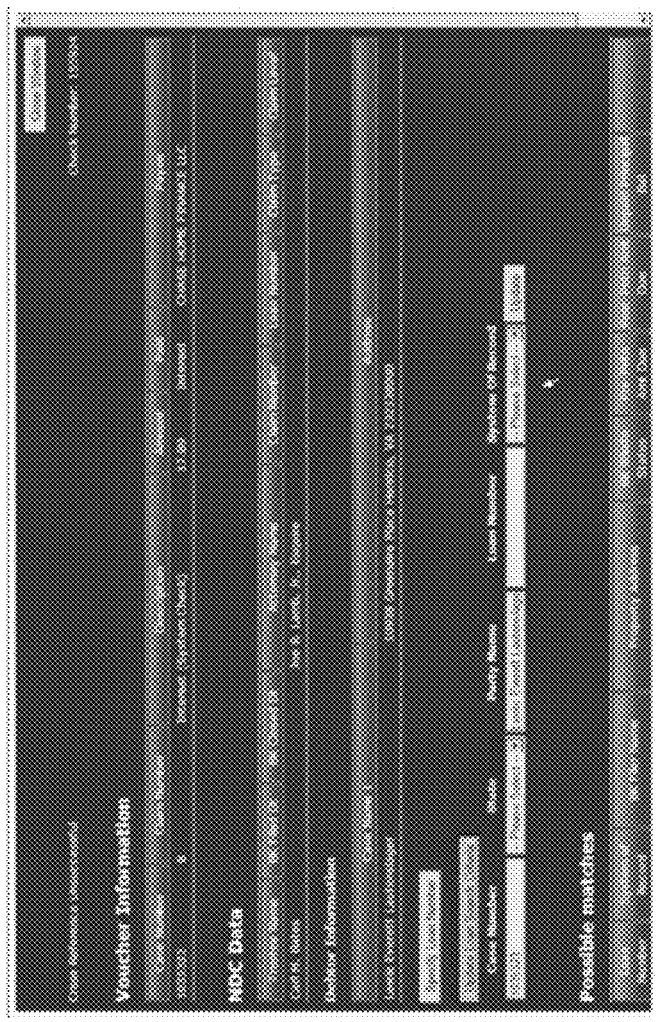

FIGS. 21A and 21B show a flowchart of a third illustrative method 2100 in which data is retrieved from a client loan system and processed. Step 2102 comprises performing an automated login to a client loan system. Step 2104 comprises executing an inquiry to the client loan system. Step 2106 comprises utilizing processing rules and criteria to implement multiple-pass searches for data to cross reference. Step 2108 comprises storing results data from the retrieved presented data. Step 2110 comprises parsing the stored results data. Step 2112 comprises assessing the validity of the stored results data. Step 2114 comprises executing analyses to determine a creditor asset basis. Step 2116 comprises executing analyses to determine a discreet loan match or multiple possible loan matches. If multiple possible loan matches are indicated, then step 2188 comprises presenting the result on the user interface.

FIGS. 22-26 respectively show various illustrative screen captures 2200, 2300, 2400, 2500, and 2600 of user interfaces that are displayed on a client computer as the third illustrative method 2100 described above is practiced.

Figure 27A:
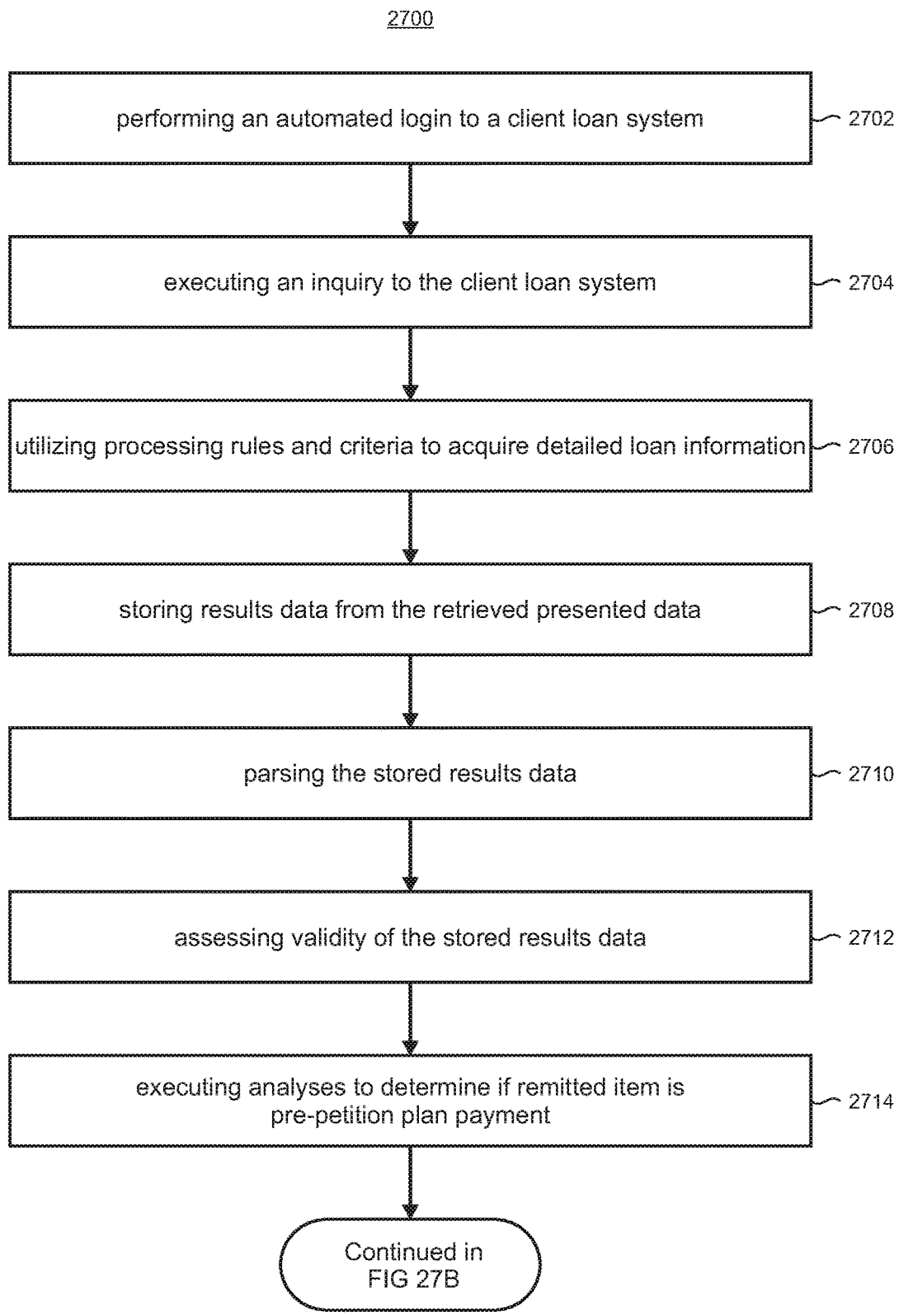
FIGS. 27A and 27B show a flowchart of a fourth illustrative method in which data is retrieved from a client loan system and processed.
Figure 27B:
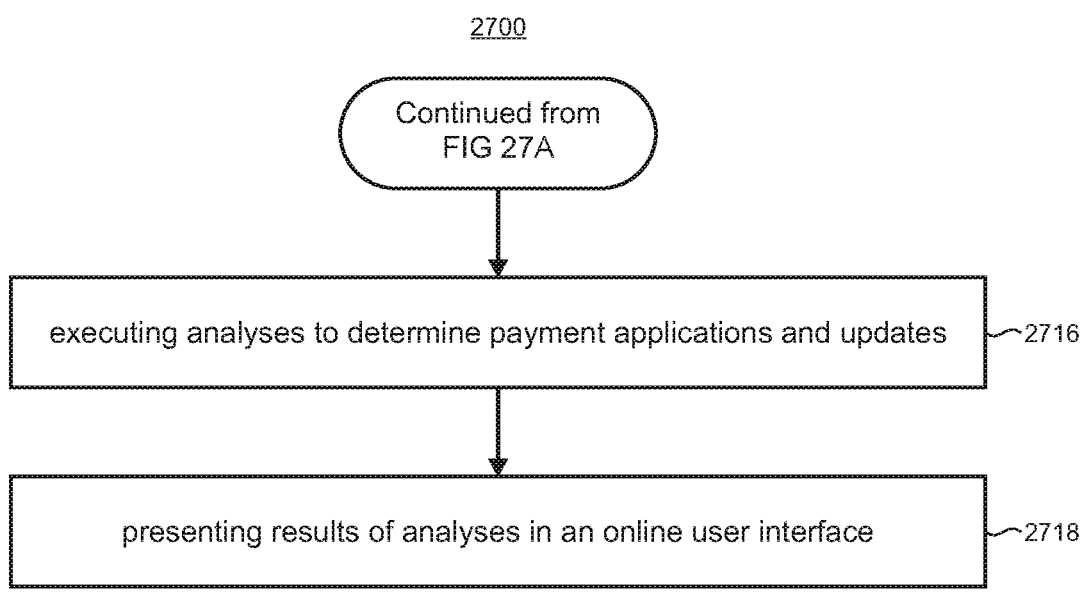

FIGS. 27A and 27B show a flowchart of a fourth illustrative method 2700 in which data is retrieved from a client loan system and processed. Step 2702 comprises performing an automated login to a client loan system. Step 2704 comprises executing an inquiry to the client loan system. Step 2706 comprises utilizing processing rules and criteria to acquire detailed loan information. Step 2708 comprises storing results data from the retrieved presented data. Step 2710 comprises parsing the stored results data. Step 2712 comprises assessing the validity of the stored results data. Step 2714 comprises executing analyses to determine if the remitted item is a pre-petition plan payment. Step 2716 comprises executing analyses to determine payment applications and updates and step 2718 comprises presenting results of analyses in an online user interface.

Figure 28:
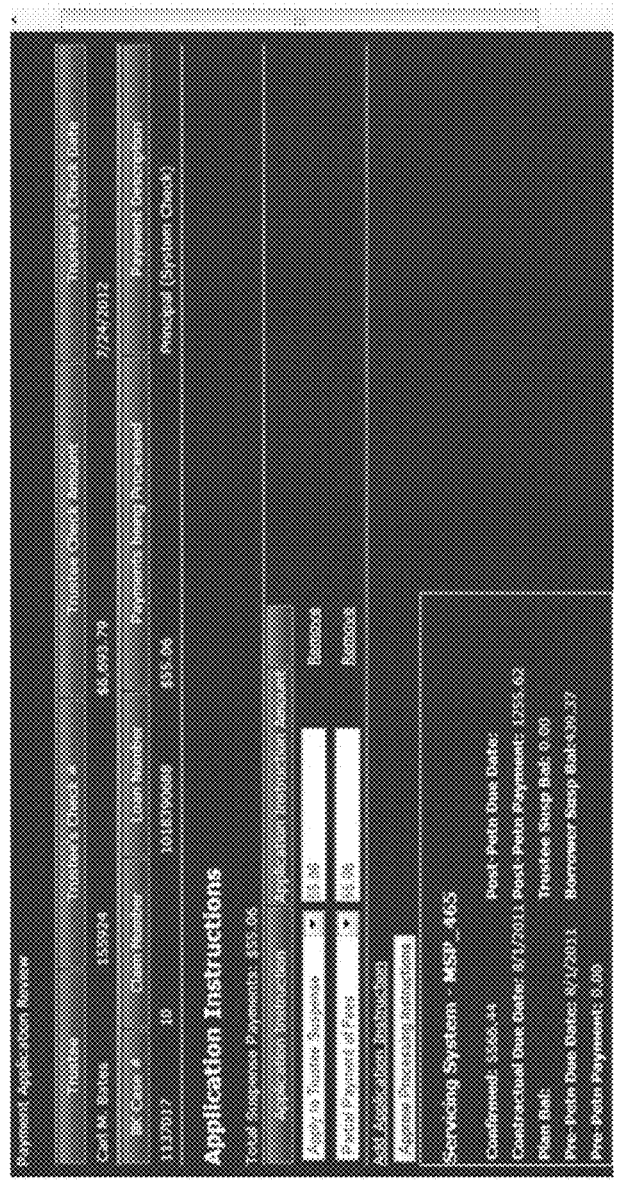
FIG. 28 shows an illustrative screen capture of a user interface that is displayed on a client computer as the fourth illustrative method is practiced.

FIG. 28 shows an illustrative screen capture 2800 of a user interface that is displayed on a client computer as the fourth illustrative method 2700 described above is practiced.

Figure 29:
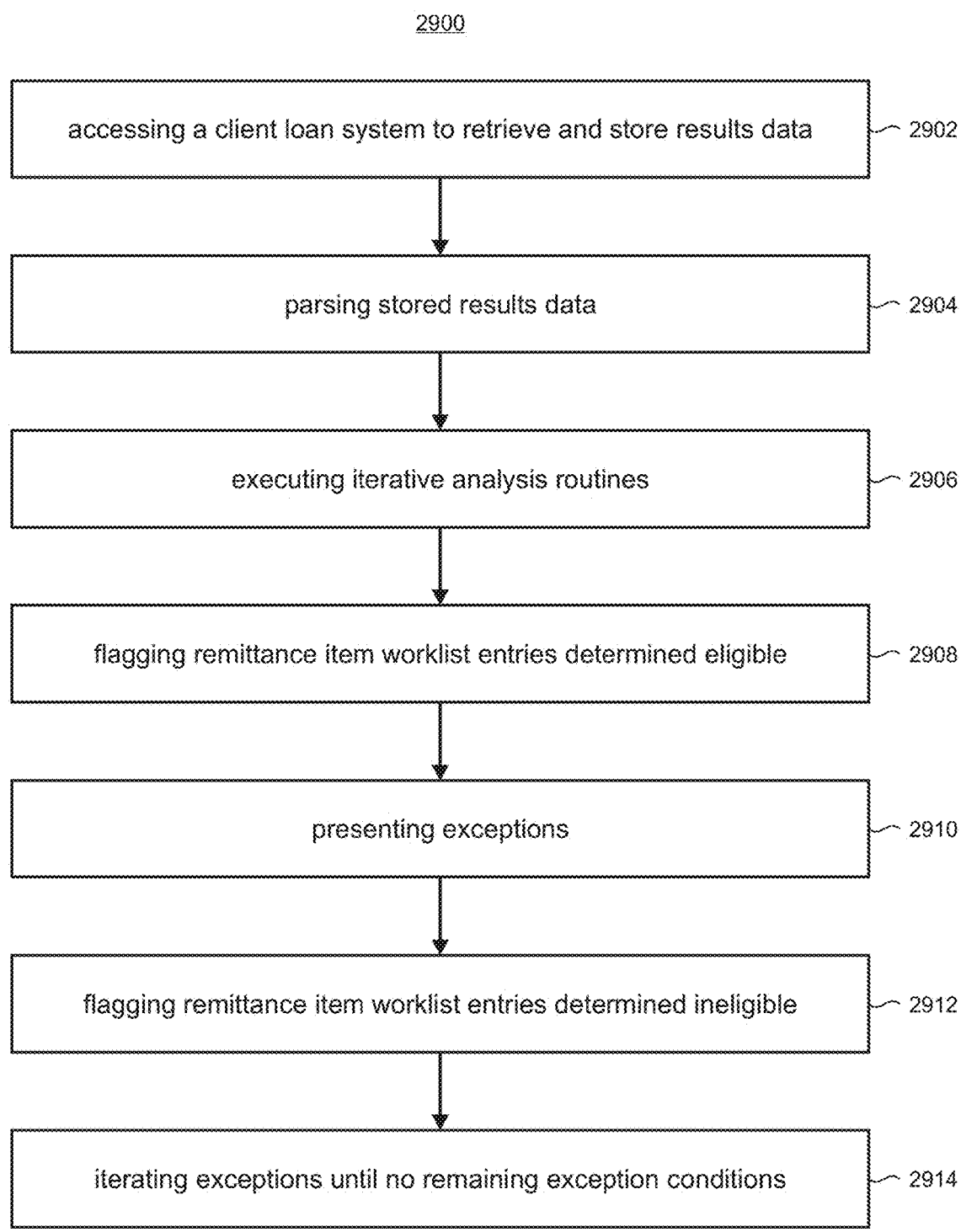
FIG. 29 shows a flowchart of a fifth illustrative method in which collected case, claim, and loan data elements are analyzed using logical comparison and fractal analyses to determine eligibility for payment application decision-making.

FIG. 29 shows a flowchart of a fifth illustrative method 2900 in which collected case, claim, and loan data elements are analyzed using logical comparison and fractal analyses to determine eligibility for payment application decision-making. Step 2902 comprises accessing a client loan system to retrieve and store results data. Step 2904 comprises parsing stored results data. Step 2906 comprises executing iterative analysis routines. Step 2908 comprises flagging remittance item worklist entries determined eligible. Step 2910 comprises presenting exceptions. Step 2912 comprises flagging remittance item worklist entries that are determined as being ineligible. Step 2914 comprises iterating exceptions until no remaining exception conditions are evident.

Figure 30:
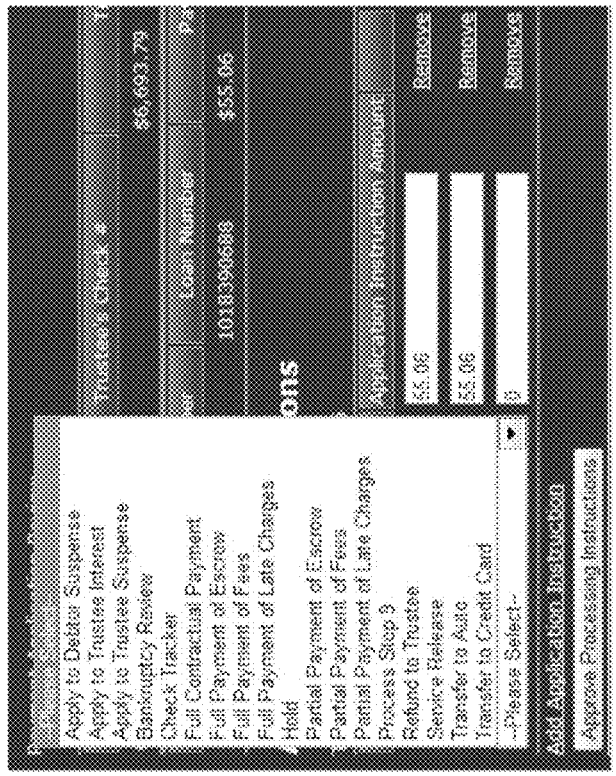
FIG. 30 shows an illustrative screen capture of a user interface that is displayed on a client computer as the fifth illustrative method is practiced.

FIG. 30 shows an illustrative screen capture 3000 of a user interface that is displayed on a client computer as the fifth illustrative method 2900 described above is practiced.

Figure 31A:
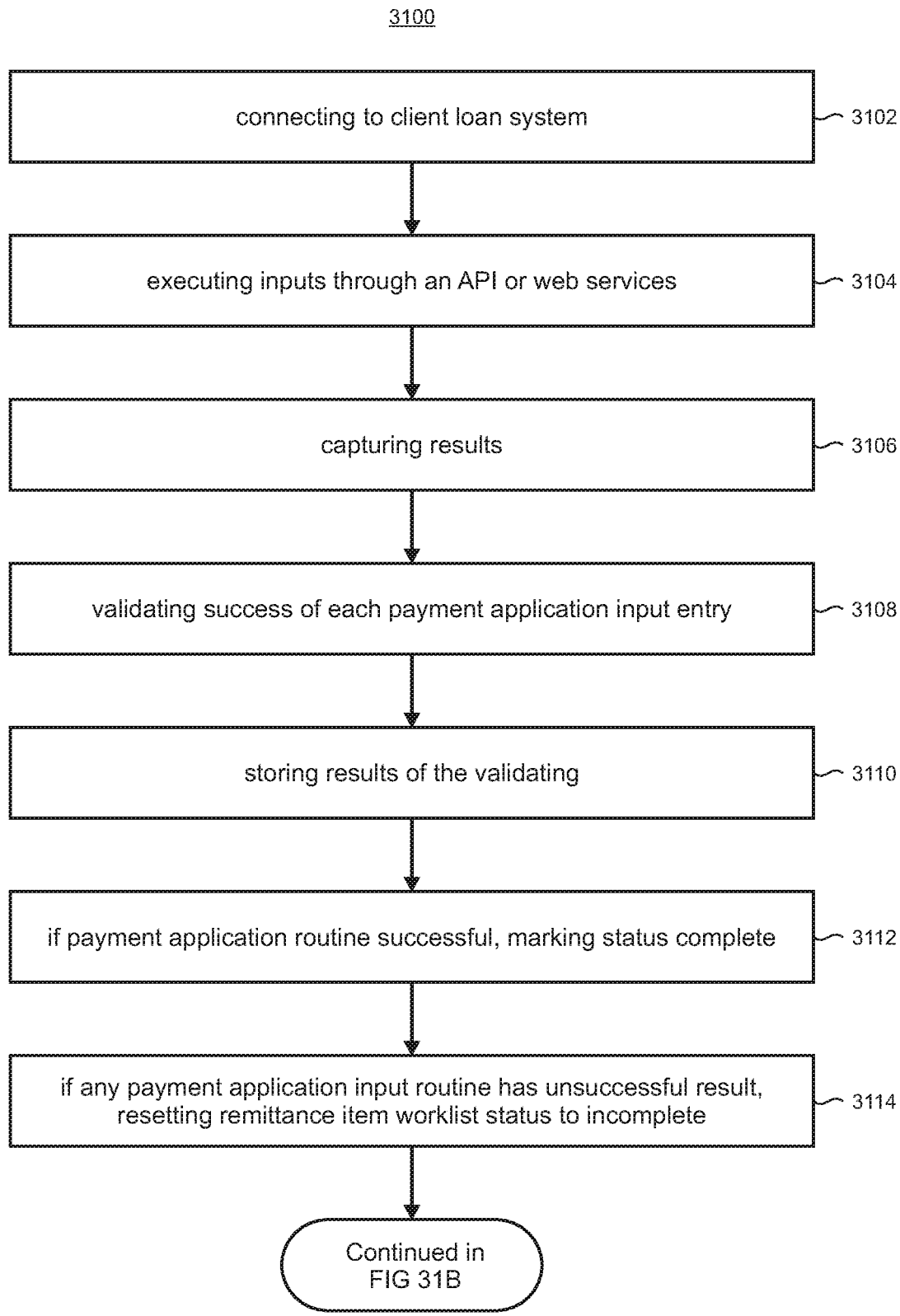
FIGS. 31A and 31B shows a flowchart of a sixth illustrative method in which payment applications are made to a loan and loan fields are updated in records held in a client loan system.
Figure 31B:
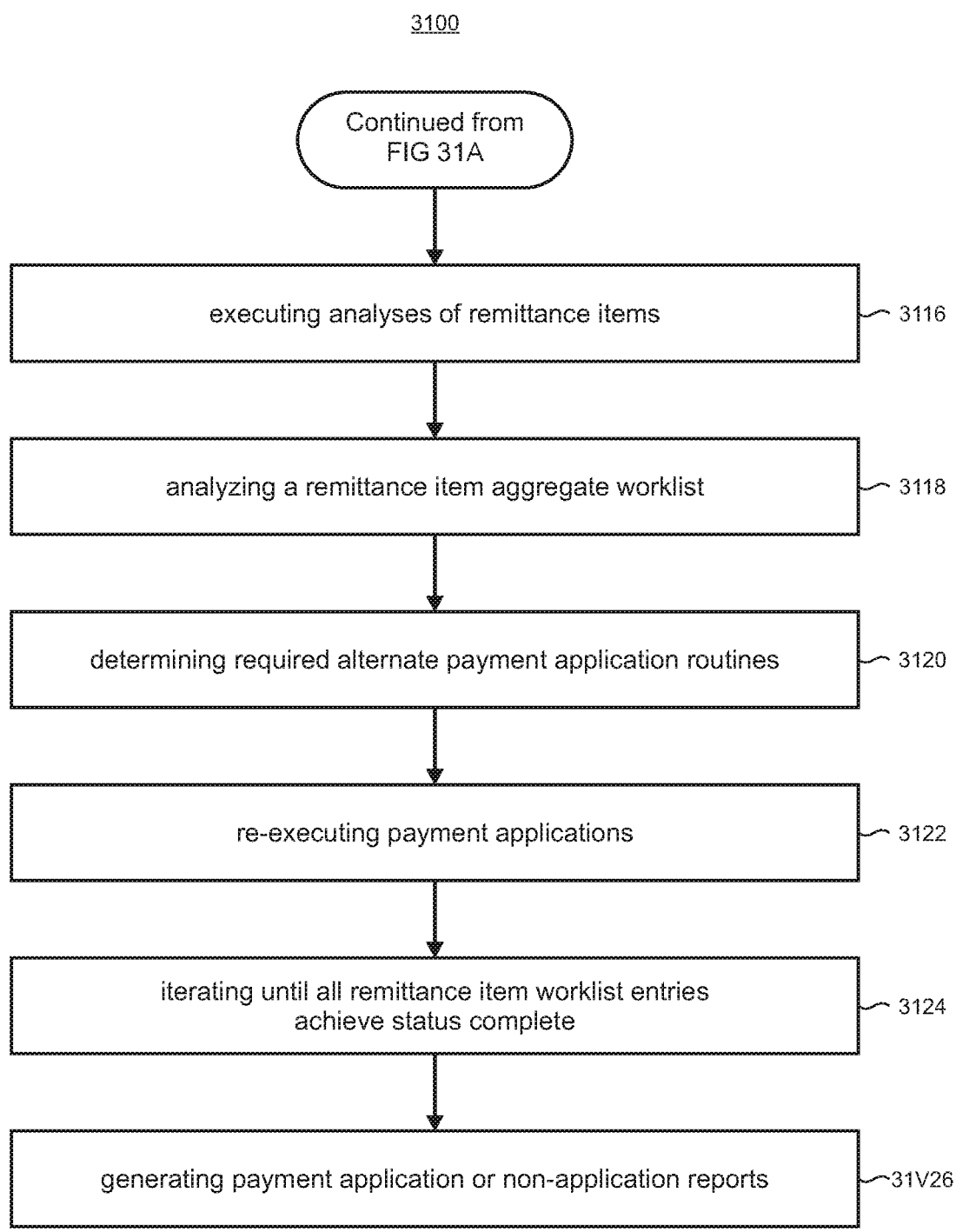

FIGS. 31A and 31B shows a flowchart of a sixth illustrative method 3100 in which payment applications are made to a loan and loan fields are updated in records held in a client loan system. Step 3102 comprises connecting to client loan system. Step 3104 comprises executing inputs through an API (application programming interface) or web services. Step 3106 comprises capturing results. Step 3108 comprises validating success of each payment application input entry. Step 3110 comprises storing results of the validating step. If the payment application routine is successful, the step 3112 comprises marking the status as complete.

If any payment application input routine has an unsuccessful result, then step 3114 comprises resetting remittance item worklist status to incomplete. Step 3116 comprises executing analyses of remittance items. Step 3118 comprises analyzing a remittance item aggregate worklist. Step 3120 comprises determining any required alternate payment application routines. Step 3122 comprises re-executing payment applications. Step 3124 comprises performing iterations until all remittance item worklist entries achieve a status of being complete. Step 3126 comprises generating payment application or non-application reports.

Figure 32:
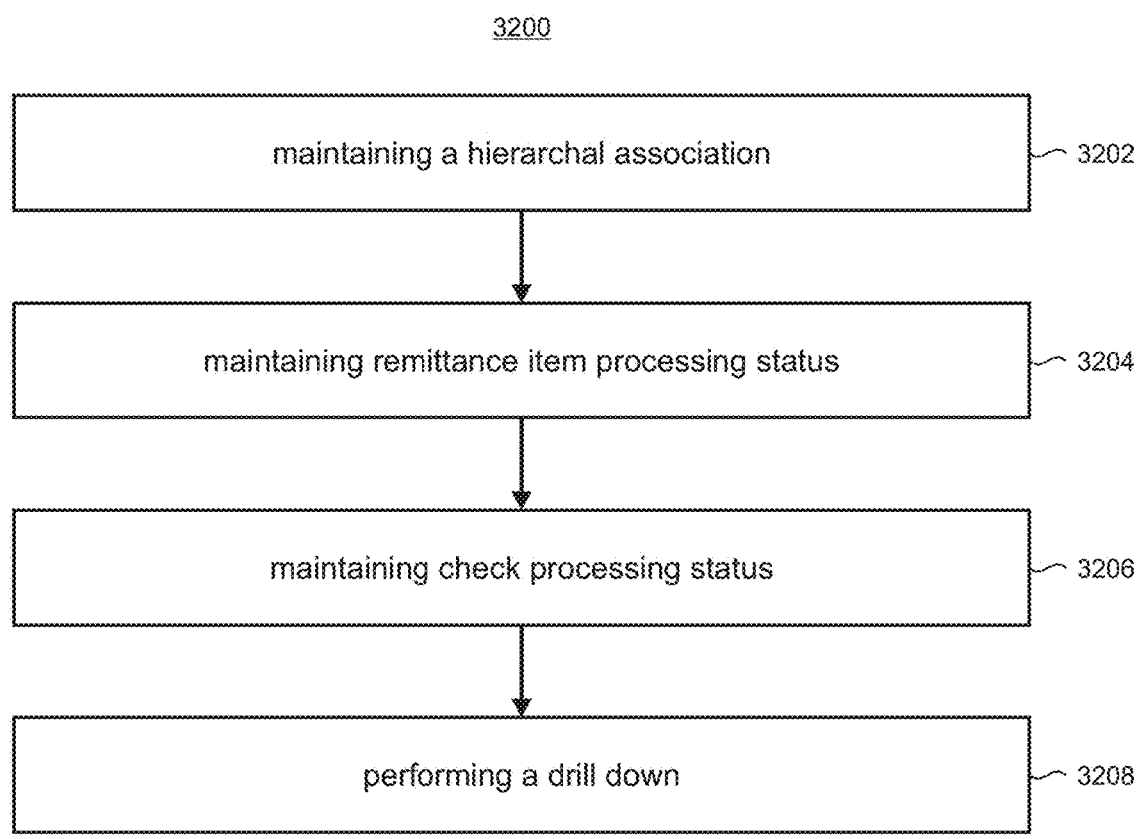
FIG. 32 shows a flowchart of a seventh illustrative method in which daily balancing of check remittances is controlled.
Figure 33:
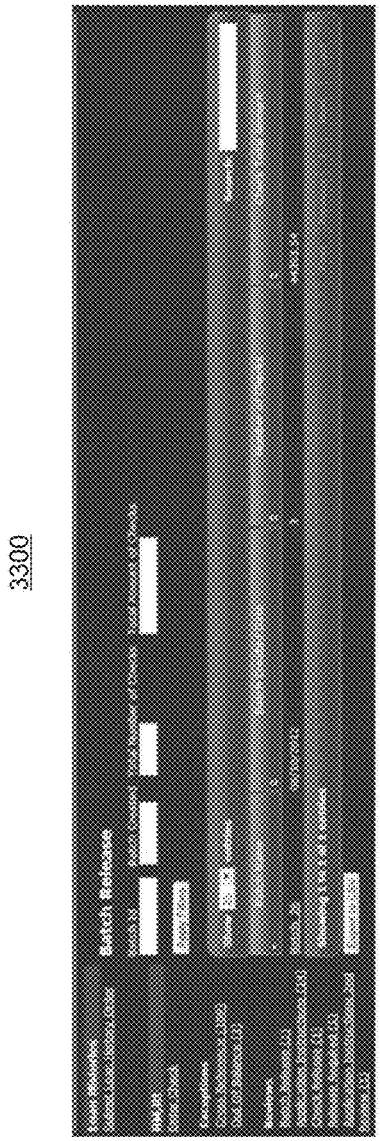
FIGS. 33-37 show various illustrative screen captures of user interfaces that are displayed on a client computer as the seventh illustrative method is practiced.
Figure 34:
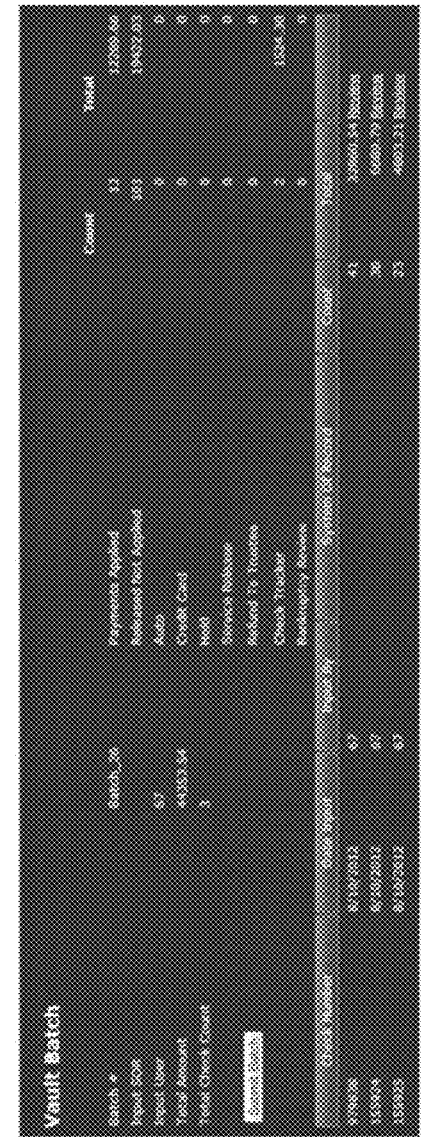
Figure 35:
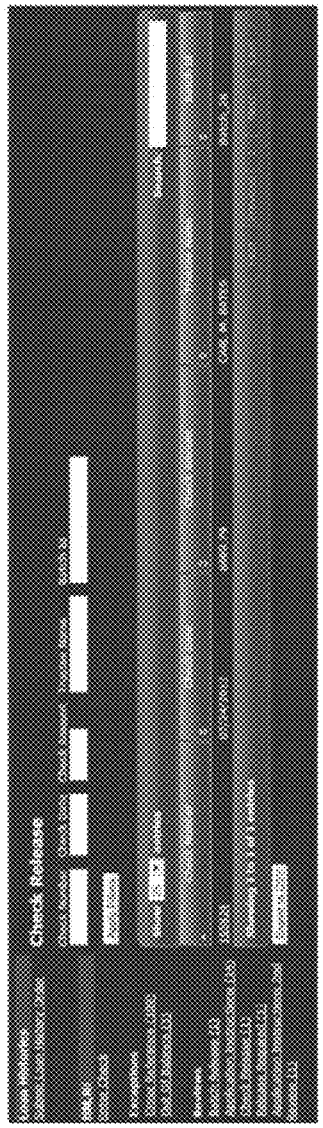
Figure 36:
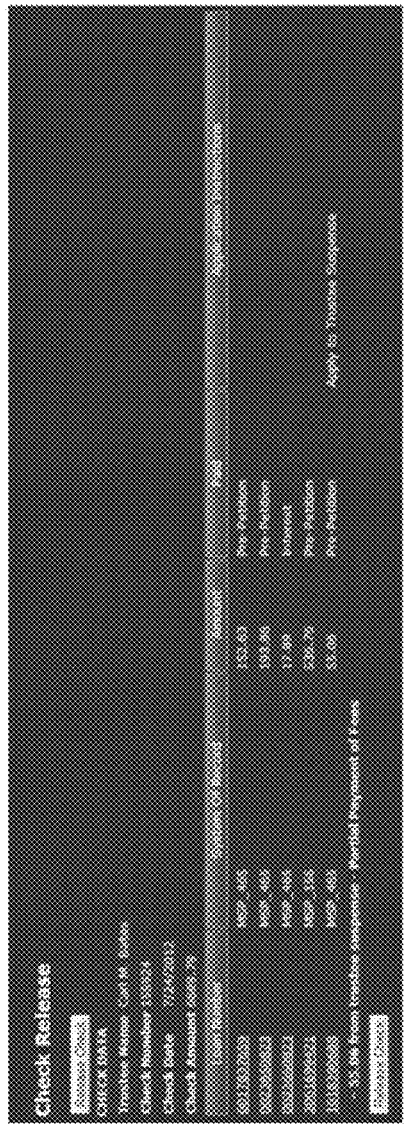
Figure 37:

FIG. 32 shows a flowchart of a seventh illustrative method 3200 in which daily balancing of check remittances is controlled. Step 3202 comprises maintaining a hierarchal association. Step 3404 comprises maintaining remittance item processing status. Step 3406 comprises maintaining check processing status, and step 3408 comprises performing a drill down.

FIGS. 33-37 respectively show various illustrative screen captures 3400, 3500, 3600, and 3700 of user interfaces that are displayed on a client computer as the seventh illustrative method 3200 described above is practiced.

Figure 38:
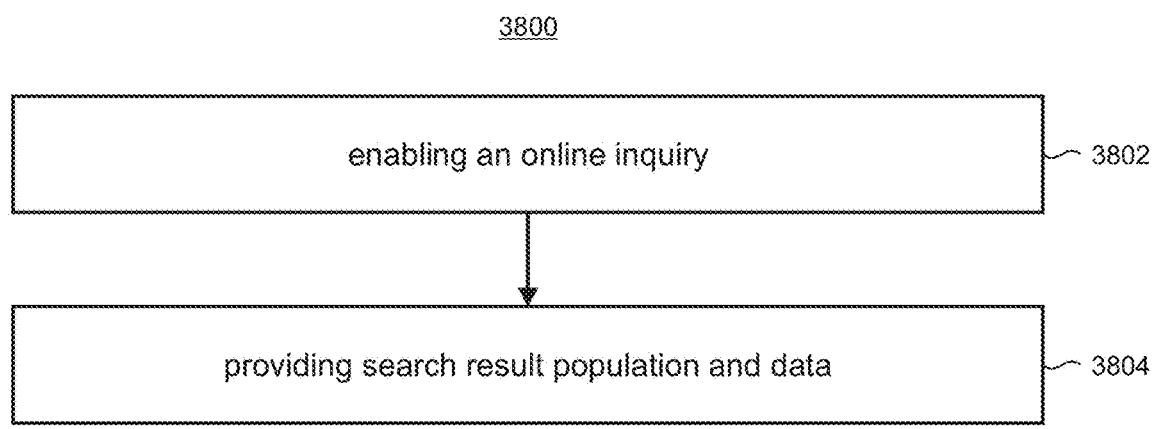
FIG. 38 shows a flowchart of an eighth illustrative method in which detailed data elements, processing paths, intermediate and final statuses, user entries, and user comments are maintained as a detailed supplement to loan processing records for audit purposes.

FIG. 38 shows a flowchart of an eighth illustrative method 3800 in which detailed data elements, processing paths, intermediate and final statuses, user entries, and user comments are maintained as a detailed supplement to loan processing records for audit purposes. Step 3802 comprises enabling an online inquiry and step 3804 comprises providing search result population and data.

Figure 39A:
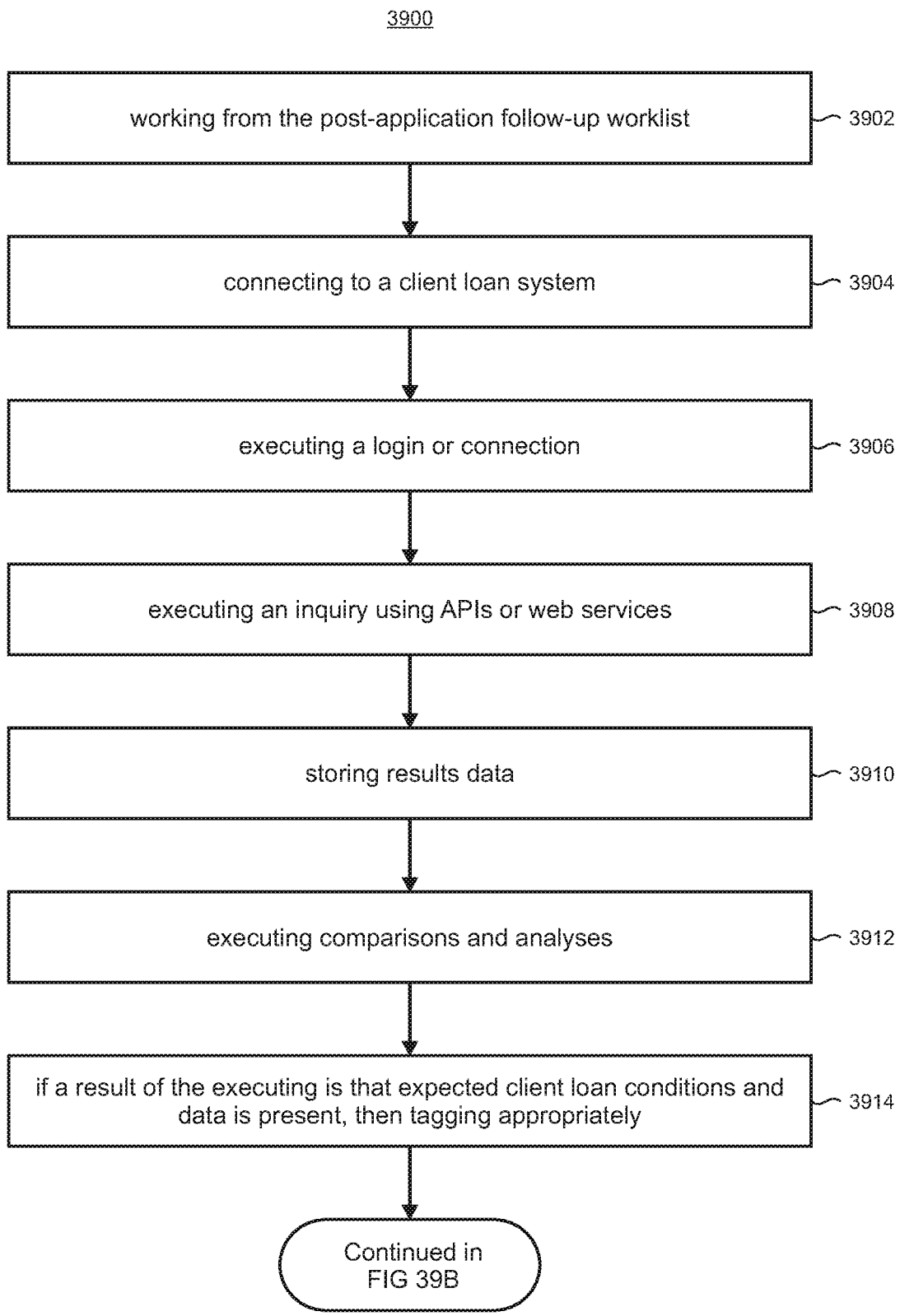
FIGS. 39A and 39B show a flowchart of a ninth illustrative method for performing a self-check and follow-up when a voucher entry disposition includes one or more payment applications to ensure verification of proper post-application loan condition and status.
Figure 39B:
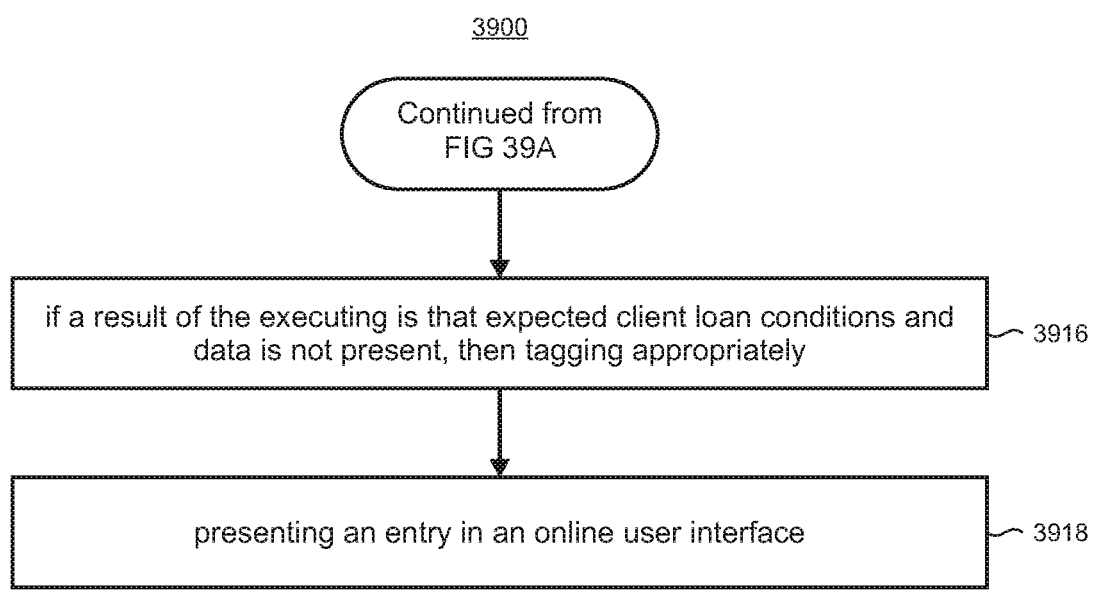
Figure 40:
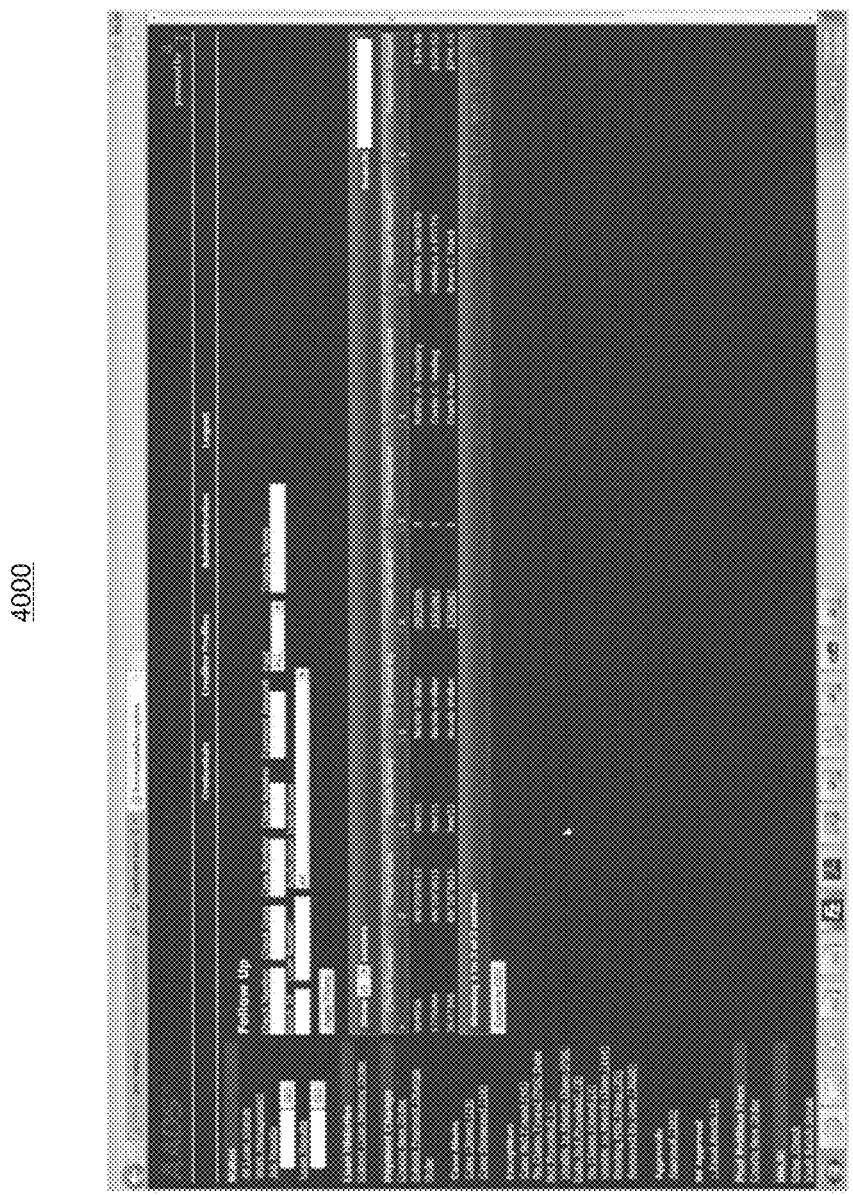
FIGS. 40-43 shows various illustrative screen captures of user interfaces that are displayed on a client computer as the ninth illustrative method is practiced.
Figure 41:
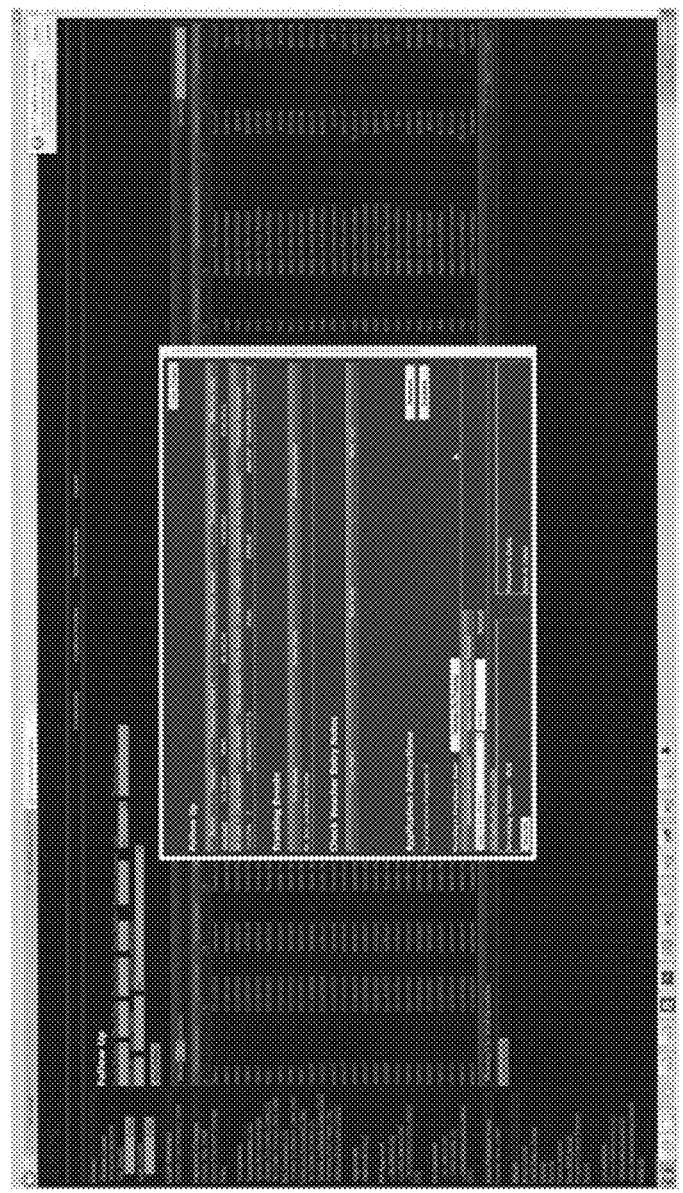
Figure 42:
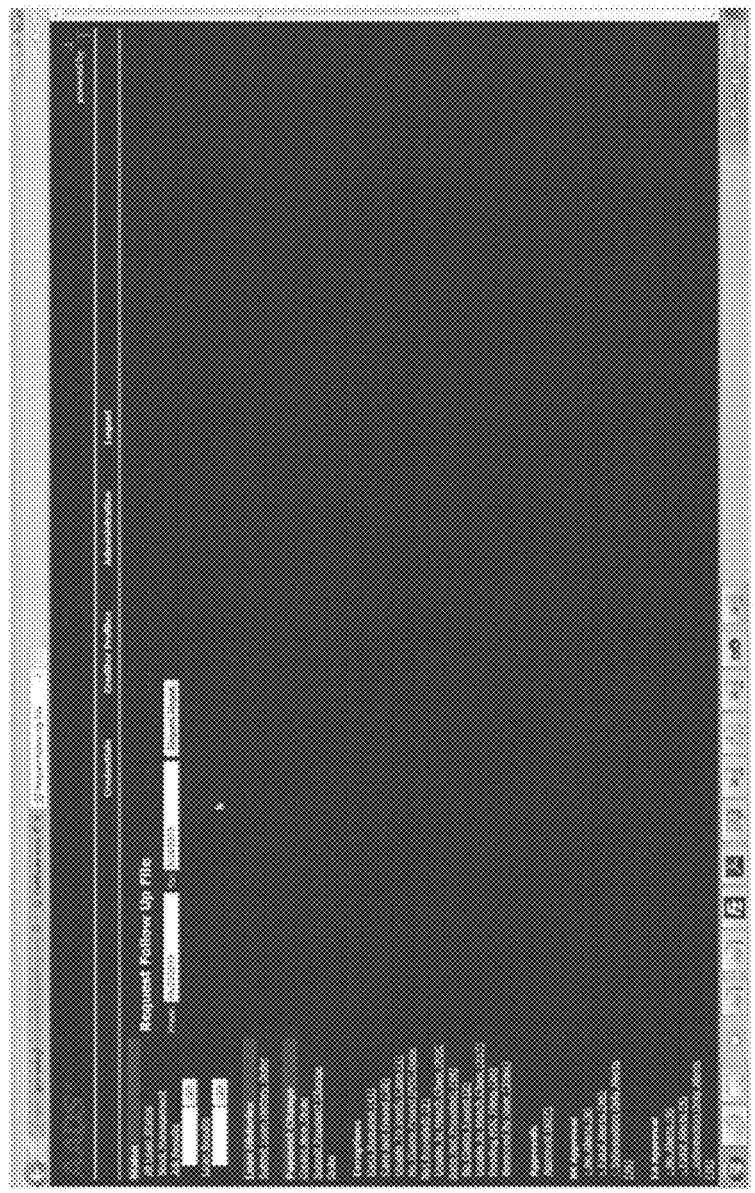
Figure 43:
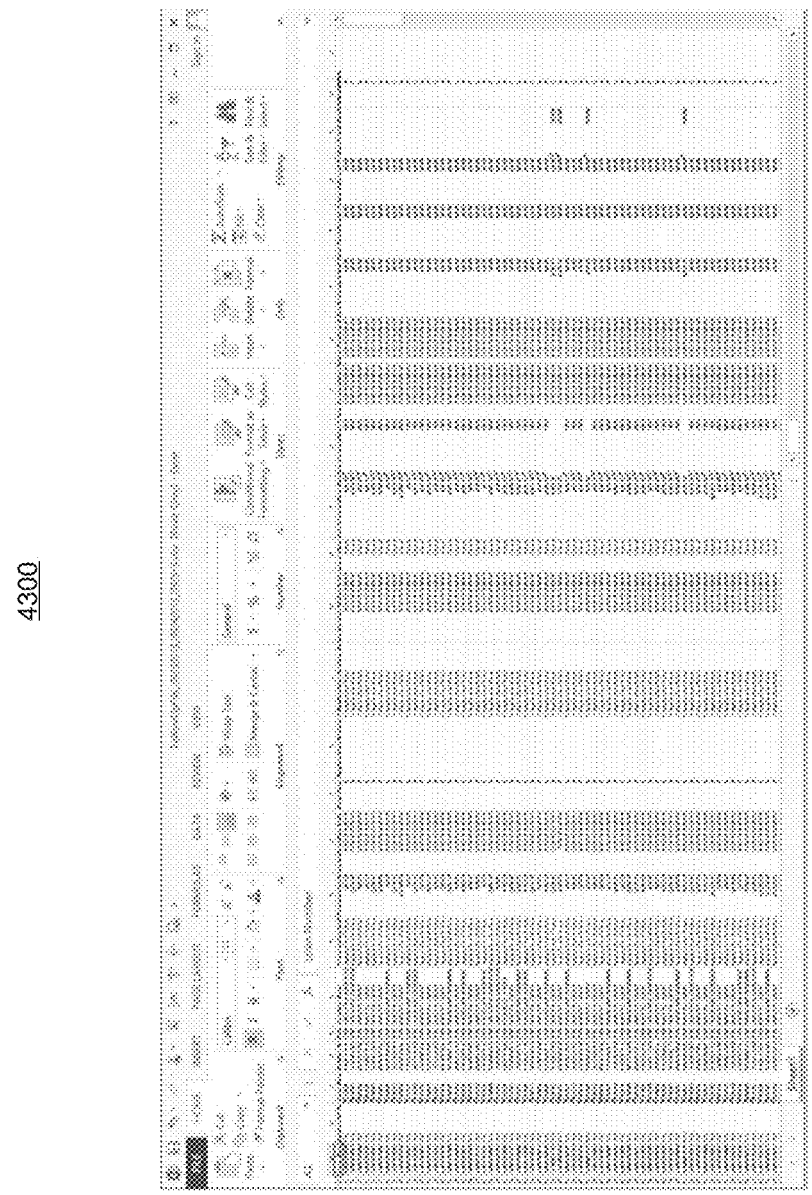

FIGS. 39A and 39B show a flowchart of a ninth illustrative method 3900 for performing a self-check and follow-up when a voucher entry disposition includes one or more payment applications to ensure verification of proper post-application loan condition and status. Step 3902 comprises working from a post-application follow-up worklist. Step 3904 comprises connecting to a client loan system. Step 3906 comprises executing a login or connection. Step 3908 comprises executing an inquiry using APIs or web services. Step 3910 comprises storing results data. Step 3912 comprises executing comparisons and analyses. If a result of the executing is that expected client loan conditions and data is present, then step 3914 comprises performing tagging as appropriate.

If a result of the executing is that expected client loan conditions and data is not present, then step 3916 comprises performing tagging as appropriate. Step 3918 comprises presenting an entry in an online user interface.

FIGS. 40-43 respectively show various illustrative screen captures 4000, 4100, 4200, and 4300 of user interfaces that are displayed on a client computer as the ninth illustrative method 3900 described above is practiced.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed:

1. A computer-implemented method operable on a local automated trustee payment computing system for processing remittance checks provided to a client from a bankruptcy trustee, the method utilizing an ordered set of rules to implement the steps of:

receiving input data over a network at the automated trustee payment computing system from a client computer that operates in a first remote computing system, the input data representing information from a remittance check from the bankruptcy trustee including a processing identifier, the remittance check providing for payment of funds that are applicable to one or more bankrupt debtor accounts;

responsively to receiving the input, creating a check processing worklist at the automated trustee payment computing system from the remittance check data;

navigating from the automated trustee payment computing system over the network to a web-based trustee data repository system that operates in a second remote computing system;

executing a login to the trustee data repository system at the automated trustee payment computing system using login credentials associated with the client;

capturing a response to the login from the trustee data repository system at the automated trustee payment computing system;

assessing the captured response to the login at the automated trustee payment computing system to verify success of the login to the trustee data repository system;

if the login is unsuccessful, re-performing the navigating to a checking remittance processing start screen at the automated trustee payment computing system;

navigating to a voucher page on the trustee data repository system using the automated trustee payment computing system;

capturing a response to the voucher page navigation from the trustee data repository system at the automated trustee payment computing system;

assessing the captured response to the voucher page navigation at the automated trustee payment computing system to verify that navigation to a correct voucher page is successful;

if the navigation is unsuccessful, re-performing the navigating and capturing at the automated trustee payment computing system;

at the automated trustee payment computing system, executing a voucher search on the voucher page on the trustee data repository system using voucher search data extracted from the check processing worklist;

capturing a response to the voucher search from the trustee data repository system at the automated trustee payment computing system;

assessing the captured response to the voucher search at the automated trustee payment computing system to verify whether a retrieved check identified in the voucher search correctly matches the remittance check;

at the automated trustee payment computing system, executing a voucher download from the trustee data repository system;

capturing a response to the voucher download at the automated trustee payment computing system;

assessing the captured response to the voucher download at the automated trustee payment computing system;

saving data from the voucher download into a processing database that is operable by the automated trustee payment computing system;

parsing the data to create data elements that are populated into the processing database, the parsing including assessing validity of data from the voucher download by executing comparative and analytical routines on the data elements at the automated trustee payment computing system;

implementing a self-learning function on the automated trustee payment computing system in which the created data elements from the data parsing are used by the automated trustee payment computing system to self-learn characteristics of a payment decision, the characteristics being automatically utilized for subsequent decisions for payments having matching processing identifiers, wherein execution of the self-learning function operates in an iterative loop to implement a multiple-affirmation threshold for triggering automatic application of characteristics of a prior payment decision to a subsequent payment decision, and wherein the self-learning function implements learning by observing how exceptions are resolved and actions are validation by affirmations by the user prior to reaching the threshold that occur in each iteration of the loop;

generating a remittance item worklist from the saved data at the automated trustee payment computing system;

at the automated trustee payment computing system, summing entries in the remittance item worklist, comparing the summed items against a total amount in the remittance check, and reconciling the remittance item worklist and remittance check; and reporting, from the automated trustee payment system to the first remote computing system in response to the received input data, differences between summed entries in the remittance item worklist and the total payment included in the remittance check.

2. The computer-implemented method of claim 1 in which the information further includes trustee name, check number, check date, and total check amount.

3. The computer-implemented method of claim 2 in which the information further includes a check effective date.

4. The computer-implemented method of claim 1 in which the processing identifier comprises a batch number.

5. The computer-implemented method of claim 1 in which the input is received from either an online user at the client computer, or from an external system using an electronic transfer.

6. The computer-implemented method of claim 1 in which the login credentials are maintained in and retrieved from a secure encrypted table.

7. The computer-implemented method of claim 1 including a further step of amending an entry to the remittance item worklist if the login is unsuccessful or if the navigating to the voucher page is unsuccessful.

8. The computer-implemented method of claim 7 including a further step of generating a notification if the login is unsuccessful or if the navigating to the voucher page is unsuccessful.

9. The computer-implemented method of claim 1 in which the voucher search data comprises trustee and check number.

10. The computer-implemented method of claim 1 in which assessing the captured response to the voucher download comprises verifying that a trustee name and total check amount in the downloaded voucher matches the voucher search data.

11. The computer-implemented method of claim 1 in which the saving comprises saving the downloaded voucher data as a text file.

12. The computer-implemented method of claim 1 further including a step of receiving input from the client to resolve differences between summed entries in the remittance item worklist and the total of the remittance check.

13. The computer-implemented method of claim 12 in which the resolution comprises one of correcting the remittance check total, editing entries in the remittance item worklist, adding entries to the remittance item worklist, checking dates, or removing entries from the remittance item worklist.

14. The computer-implemented method of claim 13 including a further step of iterating the summing and comparison of items in the remittance item worklist after a resolution attempt.

15. The computer-implemented method of claim 1 in which the trustee data repository system is implemented as an NDC (National Data Center) website.

16. The computer-implemented method of claim 1 further comprising:

assessing the captured response to the login to verify success of the login to the trustee data repository system;

if the login is unsuccessful, navigating to a checking remittance processing start screen;

executing a case search using case search data extracted from the check processing worklist, the case search data including a trustee and a case number;

capturing a response to the case search from the trustee data repository system;

assessing the captured response to the case search to verify that a correct case is retrieved;

navigating to a case summary page on the trustee data repository system;

capturing a response to the case summary page navigation from the trustee data repository system;

assessing the captured response to the case summary page navigation to verify that navigation to a correct case summary page is successful;

if the navigation is unsuccessful, re-performing the steps of navigating and capturing;

storing results data from the case summary page;

parsing the stored results data from the case summary page to create case data elements that are populated into a processing database and appending the results data to entries in a remittance item worklist;

navigating to a claim summary page on the trustee data repository system;

capturing a response to the claim summary page navigation from the trustee data repository system;

assessing the captured response to the claim summary page navigation to verify that navigation to a correct account ledger page with a correct case is successful;

storing results data from the claim summary page;

parsing the stored results data from the claim summary page to create claim data elements that are populated into the processing database and appending the results data to entries in the remittance item worklist;

navigating to a remittance item claim on the claim summary page;

capturing a response to the remittance item claim navigation from the trustee data repository system;

assessing the captured response to the remittance item claim navigation to verify that navigation to a correct remittance item claim is successful;

storing results data from the remittance item claim; and parsing the stored results data from the remittance item claim to create remittance item claim data elements that are populated into the processing database and appending the results data to entries in the remittance item worklist.

\* \* \* \* \*

UNITED STATES PATENT AND TRADEMARK OFFICE
CERTIFICATE OF CORRECTION

PATENT NO. : 11,263,600 B2
APPLICATION NO. : 15/080212
DATED : March 1, 2022
INVENTOR(S) : W. C. Taylor, III and Michael S. Ackerman Page 1 of 1

It is certified that error appears in the above-identified patent and that said Letters Patent is hereby corrected as shown below:

In the Specification

At Column 2, Line 60, after "tracking of" delete the word "the".

Signed and Sealed this
Tenth Day of May, 2022

Katherine Kelly Vidal
*Director of the United States Patent and Trademark Office*